US008423912B2

(12) United States Patent  
Irani et al.

(10) Patent No.: US 8,423,912 B2  
(45) Date of Patent: Apr. 16, 2013

(54) SELECTABLE PARENT AND SUBMENU OBJECT DISPLAY METHOD WITH VARIED ACTIVATION AREA SHAPE

(76) Inventors: Pourang Irani, Winnipeg (CA); Erum Tanvir, Winnipeg (CA)

( * ) Notice: Subject to any disclaimer, the term of this patent is extended or adjusted under 35 U.S.C. 154(b) by 254 days.

(21) Appl. No.: 12/825,554

(22) Filed: Jun. 29, 2010

(65) Prior Publication Data

US 2011/0320984 A1  Dec. 29, 2011

(51) Int. Cl.  
G06F 3/048 (2006.01)

(52) U.S. Cl.  
USPC .......................................... 715/841; 715/811

(58) Field of Classification Search .................. 715/810, 715/841, 828, 829, 825, 817, 811  
See application file for complete search history.

(56) References Cited

U.S. PATENT DOCUMENTS

| | | | | |
|---|---|---|---|---|
| 5,596,699 | A * | 1/1997 | Driskell | 715/834 |
| 5,760,776 | A * | 6/1998 | McGurrin et al. | 715/841 |
| 5,801,703 | A * | 9/1998 | Bowden et al. | 715/841 |
| 5,805,167 | A * | 9/1998 | van Cruyningen | 715/808 |
| 5,956,035 | A * | 9/1999 | Sciammarella et al. | 715/815 |
| 5,999,895 | A * | 12/1999 | Forest | 704/1 |
| 6,100,889 | A * | 8/2000 | Sciammarella et al. | 715/815 |
| 6,266,098 | B1 * | 7/2001 | Cove et al. | 348/563 |
| 6,903,723 | B1 * | 6/2005 | Forest | 345/157 |
| 7,814,439 | B2 * | 10/2010 | Fitzmaurice et al. | 715/856 |
| 8,136,045 | B2 * | 3/2012 | Miura et al. | 715/764 |
| 2004/0165012 | A1 * | 8/2004 | Nelson et al. | 345/828 |
| 2004/0165013 | A1 * | 8/2004 | Nelson et al. | 345/858 |
| 2006/0095865 | A1 * | 5/2006 | Rostom | 715/810 |

OTHER PUBLICATIONS

Tanvir, "Improving Cascading Menu Selections with Adaptive Activation Areas", Master of Science thesis, University of Manitoba. Aug. 2009.*

Tanvir et al., "AAMU: adaptive activation area menus for improving selection in cascading pull-down menus", Proceedings of the twenty-sixth annual SIGCHI conference on Human factors in computing systems (CHI '08), pp. 1381-1384. Apr. 2008. DOI=10.1145/1357054.1357270.*

Cockburn et al., "Faster cascading menu selections with enlarged activation areas", Proceedings of Graphics Interface 2006 (GI '06), pp. 65-71. 2006.*

(Continued)

Primary Examiner — Stephen Hong  
Assistant Examiner — Joseph R Burwell  
(74) Attorney, Agent, or Firm — Ryan W. Dupuis; Kyle R. Saherthwait; Ade & Company Inc

(57) ABSTRACT

Selectable objects in a computer display are arranged in a cascading menu including parent menu and submenu objects in which an activation area is provided in association with each submenu displayed which spans between the submenu and the associated parent menu object. The activation area provides the function of maintaining display of a submenu associated with a selected parent menu object while the cursor remains in contact with the activation area. An override function is provided to minimize trapping of the cursor within the activation area. The shape of the activation area is generally triangular with opposing side edges extending from an apex and the parent object being curved inwardly towards one another to also minimize trapping. The characteristics of the activation area can also be varied according to user motion patterns.

18 Claims, 25 Drawing Sheets

OTHER PUBLICATIONS

Ahlström, "Modeling and improving selection in cascading pull-down menus using Fitts' law, the steering law and force fields", Proceedings of the SIGCHI conference on Human factors in computing systems (CHI '05), pp. 61-70. Apr. 2005. DOI=10.1145/1054972.1054982.*

Ahlström et al., "Why it's quick to be square: modelling new and existing hierarchical menu designs", Proceedings of the 28th international conference on Human factors in computing systems (CHI '10). Apr. 2010. DOI=10.1145/1753326.1753534.*

Findlater et al., "A comparison of static, adaptive, and adaptable menus", Proceedings of the SIGCHI conference on Human factors in computing systems (CHI '04), pp. 89-96. Apr. 2004. DOI=10.1145/985692.985704.*

Kobayashi et al., "Considering the direction of cursor movement for efficient traversal of cascading menus", Proceedings of the 16th annual ACM symposium on User interface software and technology (UIST '03), pp. 91-94. 2003. DOI=10.1145/964696.964706.*

Pastel, "Measuring the difficulty of steering through corners", Proceedings of the SIGCHI conference on Human Factors in computing systems (CHI '06), pp. 1087-1096. Apr. 2006. DOI=10.1145/1124772.1124934.*

Sears et al., "Split menus: effectively using selection frequency to organize menus", ACM Transactions on Computer-Human Interaction (TOCHI), 1, 1 (Mar. 1994), pp. 27-51. DOI=10.1145/174630.174632.*

Yang et al., "A Model for Steering with Haptic-Force Guidance", Proceedings of the 12th IFIP TC 13 International Conference on Human-Computer Interaction: Part II (INTERACT '09), pp. 465-478. Aug. 2009. D01=10.1007/978-3-642-03658-3.*

Accot, J., Zhai, S., Apr. 18-23, 1997. Beyond Fitts' law: Models for trajectory based hci tasks. In: CHI '97: Proceedings of the SIGCHI Conference on Human Factors in Computing Systems. ACM Press, Atlanta, Georgia, United States, pp. 295-302.

Accot, J., Zhai, S., May 15-20, 1999. Performance evaluation of input devices in trajectory-based tasks: An application of the steering law. In: CHI '99: Proceedings of the SIGCHI Conference on Human Factors in Computing Systems. ACM Press, Pittsburgh, Pennsylvania, United States, pp. 466-472.

Bederson, B. B., Nov. 6-8, 2000. Fisheye menus. In: UIST '00: Proceedings of the 13th Annual ACM Symposium on User Interface Software and Technology. ACM Press, San Diego, California, United States, pp. 217-225.

Callahan, J., Hopkins, D., Weiser, M., Shneiderman, B., Jun. 15-19, 1988. An empirical comparison of pie vs. linear menus. In: CHI '88: Proceedings of the SIGCHI Conference on Human Factors in Computing Systems. ACM Press, Washington, D.C., United States, pp. 95-100.

Fitts, P., 1954. The information capacity of the human motor system in controlling the amplitude of movement. Journal of Experimental Psychology 47, 381-391.

Kurtenbach, G., Buxton, W., Apr. 24-28, 1994. User learning and performance with marking menus. In: CHI '94: Proceedings of the SIGCHI Conference on Human Factors in Computing Systems. ACM Press, Boston, Massachusetts, United States, pp. 258-264.

MacKenzie, I. S., 1992a. Fitts' law as a research and design tool in human-computer interaction. Human-Computer Interaction 7, 91-139.

MacKenzie, I. S., 1992b. Movement time prediction in human-computer interfaces. In: Conference on Graphics Interface. Morgan Kaufmann Publishers Inc., Vancouver, British Columbia, Canada, pp. 140-150.

\* cited by examiner

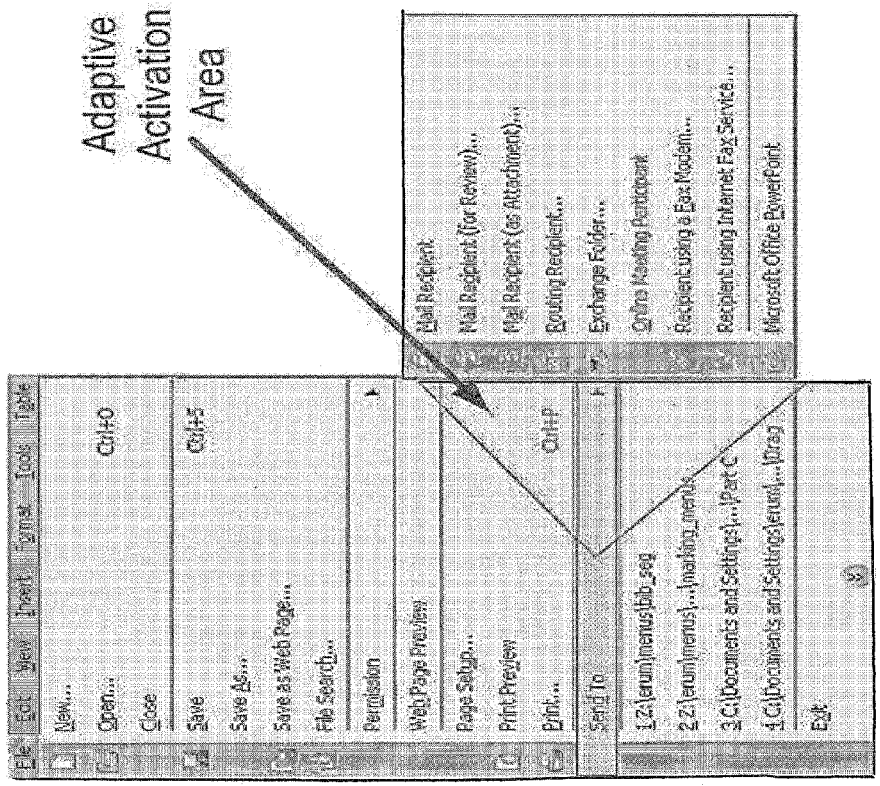
FIG. 6 (a) PRIOR ART

SELECTABLE PARENT AND SUBMENU OBJECT DISPLAY METHOD WITH VARIED ACTIVATION AREA SHAPE

FIELD OF THE INVENTION

The present invention relates to selection of objects arranged in a cascading menu including parent menu and submenu objects in which an activation area is provided in association with each submenu displayed which spans between the submenu and the associated parent menu object such that the submenu remains displayed while the cursor remains in contact with the activation area of the submenu. More particularly, the present invention relates to various improvements to the activation area including an override function, an improved shape of the activation area and improved dynamic characteristics of the activation area.

BACKGROUND

Menus are an important element of a graphical user interface (GUI) and appear ubiquitously in WIMP (window, icon, menu, pointing device) interfaces. They provide users a convenient means of interaction with the system to select and perform various operations. As software systems become more complex, menus expand in size and thereby affect navigation performance. To make menu navigation more efficient and to categorize the selection process, menus are sometimes designed as cascading menus.

Although cascading menus provide the advantage of presenting a large number of selections within a small screen space, they are limited in several ways. In traditional cascading menus, selecting an item in the child submenu requires the user to move the cursor along an elongated path. As a result, menu navigation becomes more difficult with an increasing number of levels in submenus. Users have to slide their cursor through narrow paths causing them to make movement errors since longer and narrower paths decrease efficiency of steering with the mouse or a pointing device as described in the following references: Accot, J., Zhai, S., May 15-20, 1999. Performance evaluation of input devices in trajectory-based tasks: An application of the steering law. In: *CHI '99: Proceedings of the SIGCHI Conference on Human Factors in Computing Systems*. ACM Press, Pittsburgh, Pa., United States, pp. 466-472 and Tanvir, E., Cullen, J., Irani, P., Cockburn, A., 2008. AAMU: Adaptive activation area menus for improving selection in cascading pull-down menus. In: *CHI '08: Proceeding of the twenty-sixth annual SIGCHI conference on Human factors in computing systems*. ACM New York, N.Y. USA, 1381-1384. As shown in FIG. 1, an elongated and narrow path can cause unexpected selections and unintended submenu appearance or disappearance due to straying mouse movements.

Additionally, traditional cascading menus include a time delay. When users are navigating through a menu and bring their cursor to a cascading item, the child submenu is posted after a period of 200 ms. The time delay is intended to improve the steering problem but it slows down the navigation process. An alternate option is to click on the cascading item to open the child submenu to pre-empt the delay. This clicking further slows down the interaction process and over time it can become bothersome for the users. Also, the delay could be too long for some users and too short for others. Additionally, individual preferences depend on many factors, including expertise of the user, context of the operation they are performing, and user fatigue.

Researchers have developed theoretical models to predict performance in menu navigation and selection.

Fitts' law: Fitts' law is a robust and widely adopted model for human movement. It was first published by Paul Fitts in 1954 as Fitts. P., 1954. The information capacity of the human motor system in controlling the amplitude of movement. Journal of Experimental Psychology 47, 381-391. The law predicts the time required to move from a starting position to a final target area and describes the time as a function of the distance to the target and the size of the target. The mathematical model for Fitts' law and its applications to HCI was established by MacKenzie and is also known as the Shannon formulation. This is described in the following references: MacKenzie, I. S., 1992b. Movement time prediction in human-computer interfaces. In: *Conference on Graphics Interface*. Morgan Kaufmann Publishers Inc. Vancouver, British Columbia, Canada, pp. 140-150 and Pastel R., Apr. 24-27, 2006. Measuring the difficulty of steering through corners. In: *CHI '06: Proceedings of the SIGCHI Conference on Human Factors in Computing Systems*. ACM Press, Montreal, Quebec, Canada, pp. 1087-1096. The formulation quantifies the movement task's difficulty, known as the Index of Difficulty or ID, in terms of the distance required to capture the target and the size of the target.

$$ID = \log_2(D/w + 1),$$

where D is the distance and W is the width of the object (see [12] for details). The Movement Time or MT is described as:

$$MT = a + b \times ID,$$

where a and b are constants that are empirically determined by linear regression (see MacKenzie, I. S., 1992b. Movement time prediction in human-computer interfaces. In: Conference on Graphics Interface, Morgan Kaufmann Publishers Inc., Vancouver, British Columbia, Canada, pp. 140-150 for details). Fitts' law predicts that it is easier to capture a target with a large size and is closer to the cursor. This law has been used to model the action of pointing on computers using fingers and mice and has assisted in designing user interfaces. This is described in the following references: Ahlstrom, D., Apr. 2-7, 2005. Modeling and improving selection in cascading pull-down menus using Fitts' law the steering law and force fields. In: *CHI '05: Proceedings of the SIGCHI Conference on Human Factors in Computing Systems*. ACM Press, Portland, Oreg., USA pp. 61-70; Kobayashi, M., Igarashi, T., Nov. 2-5, 2003. Considering the direction of cursor movement for efficient traversal of cascading menus. In: *UIST '03: Proceedings of the 16th Annual ACM Symposium on User Interface Software and Technology*. ACM Press, Vancouver, Canada, pp. 91-94; and Tanvir, E., September 2009. Improving cascading menu selections with adaptive activation areas. Master's thesis University of Manitoba Department of Computer Science. For example, Fitts' law aided the design of pie menus and resulting studies have shown that pie menus are more efficient and more accurate in comparison to linear menu items as described in Callahan, J., Hopkins, D., Weiser, M., Shneiderman, B., Jun. 15-19, 1988. An empirical comparison of pie vs. linear menus. In: *CHI '88: Proceedings of the SIGCHI Conference on Human Factors in Computing Systems*. ACM Press, Washington D.C. United States, pp. 95-100. However, Fitts' law has its limitations as well. It applies only to movement in a single dimension and not to movement in two dimensions. Mackenzie and Buxton described in Sears, A., Shneiderman, B., 1994. Split menus: Effectively using selection frequency to organize menus. ACM Transactions on Computer-Human Inter-action (TO- CHI) 1 (1), 27-51 some changes to improve the model's performance for 2D target acquisition tasks.

Steering Law: Accot's law or the steering law as described in Accot, J., Zhai, S., Apr. 18-23, 1997. Beyond Fitts' law: Models for trajectory based hci tasks. In: *CHI '97: Proceedings of the SIGCHI Conference on Human Factors in Computing Systems*. ACM Press, Atlanta, Ga., United States, pp. 295-302 is an extension of Fitts' law to two dimensional modeling and steering of human movement. It predicts the average time necessary to navigate or steer a pointing device (e.g., a mouse or stylus) through a 2D path, tunnel or trajectory. In this path, the user must travel from one end to the other as quickly as possible, while staying within the confines of the path. This law has been used in modeling users performance in navigating a hierarchical cascading menu and it is also used to evaluate the performance of various input devices as described in Accot, J., Zhai, S., May 15-20, 1999. Performance evaluation of input devices in trajectory-based tasks: An application of the steering law. In: *CHI '99: Proceedings of the SIGCHI Conference on Human Factors in Computing Systems*. ACM Press, Pittsburgh, Pa., United States, pp. 466-472. This model describes that the time required to travel a trajectory is directly proportional to the distance traveled and inversely proportional to the width of the path. The steering law was mathematically derived from Fitts' law. In its general form, the steering law expresses the time T required to steer through a tunnel as:

$$T=a+b(A/W),$$

where T is the average time to navigate through the path. W is the width of the path. A is the length of the path and a and b are empirically-determined constants (see Accot, J., Zhai, S., May 15-20, 1999. Performance evaluation of input devices in trajectory-based tasks: An application of the steering law. In: *CHI '99: Proceedings of the SIGCHI Conference on Human Factors in Computing Systems*. ACM Press, Pittsburgh, Pa., United States, pp. 466-472 for details). A limitation of the steering law is that the law has been verified for only a few path shapes and widths. For instance, steering is difficult through sharp corners and narrow paths as described in Tanvir, E., Cullen, J., Irani, P., Cockburn, A., 2008. AAMU: Adaptive activation area menus for improving selection in cascading pull-down menus. In: *CHI '08: Proceeding of the twenty-sixth annual SIGCHI conference on Human factors in computing systems*. ACM, New York, N.Y., USA, pp. 1381-1384, which explains the navigation problems in traditional menus.

Menu Types

Software applications are becoming increasingly complex. More functionality is offered with every new version and, as a result. GUIs are also increasing in complexity. Menus are multiplying in size, making it more difficult for the user to navigate through them. There are various categories of menus for different device types and researchers have developed a number of menu designs for each category to improve menu navigation and the selection process in user interfaces. The main categories include:

Linear Cascading Menus: Linear menus are the most common type of menus in use. They can be used with mice or pens. Menu items are generally arranged in a linear format, listing items from the top to the bottom of the screen or window. The submenus are arranged hierarchically, i.e., a parent cascaded item contains the submenu. The linear cascading menus are further categorized as:

Pull-Down Menus: They are usually used in menu bars, which are located at the top of the window or screen. A user activates the menu by clicking on its name and the menu opens in a drop-down form, presenting the possible operations that could be performed. An example is the menu bar in Microsoft Word.

Pop-Up Menus: A pop-up menu, unlike the drop down menu, can open anywhere on the screen based on the cursor position. An example is the context menu in Microsoft Windows, which is activated by right clicking the mouse.

Pen-Based Menus: Pen-based systems allow users to interact using a stylus instead of a traditional keyboard and mouse. Marking menus as described in Mackenzie, I. S., 1992a. Fitts' law as a research and design tool in human-computer interaction. *Human-Computer Interaction* 7, 91-139 are an example of pen-based menus. A marking menu allows a user to perform a menu selection by either popping-up a radial (or pie) menu, or by making a straight mark in the direction of the desired menu item without popping-up the menu. Unlike linear menus, marking menus can be operated "eyes free" because selection is based on direction of movement, not position.

Adaptive Menus: Researchers have designed different menu organization schemes for pull-down menus to reduce Fitts' law targeting requirements and to improve performance. Adaptive menus, as the name suggests, dynamically change their appearance or content over time in response to how they are being used. For example, an item list in a menu could be restructured based on usage frequency. Frequently used items are dynamically arranged on the top. Users have no control over the restructuring process. An example of an adaptive menu is the menu bar in the Microsoft Office 2003 suite. Split menus are an example of adaptive menus.

Adaptable Menus: Adaptable menus are user controlled and allow the users to customize the interface on the basis of individual preferences. For example, users can choose the menu items they want to have displayed in the top partition, as well as modify the existing arrangement. A comparison of static, adaptive, and adaptable menus as described in. Findlater, L., McGrenere, J., Apr. 24-29, 2004. A comparison of static adaptive and adaptable menus. In: *CHI '04: Proceedings of the SIGCHI Conference on Human Factors in Computing Systems*. ACM Press, Vienna, Austria, pp. 89-96, showed that users could optimize their performance if they knew about the possibility of adapting and were able to adapt their menus with a simple interface. Additionally, the results suggested that providing users with control over their menus can lead to better perceived performance and higher overall satisfaction.

Improvements to Cascading Menus

Cascading menus are the most commonly-used technique for handling hierarchical menus, however, selecting items from cascading menus is prone to errors. Cascading menus demand a high level of steering accuracy as they require the users to navigate through elongated paths. Also, conventional cascading menus are implemented with an explicit delay for the posting and unposting of the child submenu. This delay makes the selection process very slow. With the increase in complexity and size of cascading menus, there is an increasing demand for improving their design in order to make the navigation and selection process faster and easier. Researchers have designed various techniques to resolve the problems of cascading pull-down menus. Performance improvements have been obtained by either decreasing the distance to the menu items, or by increasing the size of the menu item.

Techniques for Decreasing Distance

A simple solution to make menu selection and navigation process faster is by reducing the Fitts' Law targeting requirement, i.e., reducing the distance to the target. The steering law also predicts that movement time increases with the length of the path to be covered. Most of the above-mentioned techniques have only focused on the selection of first-level items in cascading pull-down menus. However, longer selection times are caused by steering through long distances, i.e., level two and above. The techniques in FIG. 2 have also been tested for higher cascading levels. Kobayashi and Igarashi as described in Kurtenbach, G., Buxton, W., Apr. 24-28, 1994. User teaming and performance with marking menus. In: *CHI '94: Proceedings of the SIGCHI Conference on Human Factors in Computing Systems.* ACM Press, Boston Mass., United States pp. 258-264 presented an improvement to increase the usability of cascading menus by reducing the navigation distance and avoiding the unintended menu posting/unposting. This technique has two components. The first considers the direction of the cursor movement to determine the menu behavior. Vertical movement of the cursor changes the highlighted item within the current menu and the horizontal motion opens and closes the child submenus, therefore, eliminating the unwanted submenu activation during menu navigation. Second, when the horizontal motion occurs, the submenu pops up near the cursor position, hence, reducing the length of the movement path, see FIG. 2. A user must move the cursor to the right to open up a submenu or to the left to close the submenu and return to the parent menu.

A user study as described in Kurtenbach, G., Buxton, W., Apr. 24-28, 1994. User learning and performance with marking menus. In: *CHI '94: Proceedings of the SIGCHI Conference on Human Factors in Computing Systems.* ACM Press, Boston, Mass., United States, pp. 258-264 was conducted to evaluate the performance benefits of direction-based menus over traditional cascading menus. Users were asked to perform a menu selection task. The menuselection process started with the click of the mouse on a certain item in the menu bar. It ended with the selection of a highlighted menu item. The hierarchical levels of the menus for the above task ranged from two to five. The results of the study showed a 12% decrease in menu selection times as well as 85% fewer unintended submenu activations with direction-based menus.

Although the user study showed that this technique helped in decreasing movement path length, selection time and unexpected submenu activations, there are still limitations. First, the technique adds additional movements to invoke/revoke submenus, which is inconvenient and slows down the interaction process. Every time users need to view a submenu, they have to change the direction of motion, causing them to experience fatigue. Second, as the child submenu opens closer to the cursor position, submenus overlap their parent menus, and hide the rest of the parent menu items. If the user wishes to select a parent menu item while a submenu is open, this overlapping forces the user to make a left horizontal movement to close the submenu first before interacting with the parent menu. To make the selection process faster in traditional cascading pulldown menus, Ahlstrom introduced force fields as described in Ahlstrom D., Apr. 2-7, 2005. Modeling and improving selection in cascading pull-down menus using Fitts' law, the steering law and force fields. In: *CHI '05: Proceedings of the SIGCHI Conference on Human Factors in Computing Systems.* ACM Press, Portland, Oreg., USA, pp. 61-70. Force-field menus partially take control of the cursor movement from the users. Two types of force fields are used. First, when moving from left to right within a cascading item, the cursor is pushed towards the child menu and moves faster, optimizing the navigation process. Second, while moving within a non-cascading item, the force fields keep the cursor in the middle of the item, preventing the cursor from falling outside the parent menu; see FIG. 3. The most important benefit of force-field menus is that they keep the visual structure of the interface and the interaction technique unchanged.

Ahlstrom conducted a user study to evaluate the performance of force enhanced menus over traditional cascading menus as described in Ahlstrom, D., Apr. 2-7, 2005. Modeling and improving selection in cascading pull-down menus using Fitts' law, the steering law and force fields. In: *CHI '05: Proceedings of the SIGCHI Conference on Human Factors in Computing Systems.* ACM Press, Portland, Oreg., USA, pp. 61-70. Users were asked to perform a menu navigation and selection task. The user started the task by clicking a menu and then following the highlighted items. Once the target item was located, selecting the item completed the task. The menu navigation time was recorded. The hierarchical levels of the menus for the above task ranged from two to three. The results showed that the force fields decreased selection times, on average, by 18% when a mouse, a track point, or touch pad was used as an input device. One disadvantage of this technique is that while moving backwards (from right to left), the users experience resistance due to the force fields acting from left to right. Also, some users do not prefer losing control of the cursor.

Techniques for Increasing Width

The steering law suggests a second solution for faster steering by increasing the width of the path. A wider path is easier to navigate and less prone to movement errors, causing fewer unintended menu postings and unpostings.

A technique developed by Cockburn and Gin as described in Cockburn, A., Gin, A., Jun. 7-9, 2006. Faster cascading menu selections with enlarged activation areas, In: *GI '06: Proceedings of the 2006 Conference on Graphics Interface.* Canadian Information Processing Society, Quebec, Canada, pp. 65-71 is called Enlarged activation-area menus or EMUs, see FIG. 4. EMUs improve navigation through cascading menus by increasing the activation area of the parent menu associated with each cascaded submenu, providing a wider path for steering. Also, this technique allows a faster selection process by eliminating the problem of time delays. The activation areas for each cascading item are increased by extending them up to the end of the menu or by including all the non-cascading items before the next cascading item.

Cockburn and Gin conducted a user study to compare the performance of EMUs against traditional cascading menus as described in Cockburn, A., Gin, A., Jun. 7-9, 2006. Faster cascading menu selections with enlarged activation areas. In: *GI '06: Proceedings of the 2006 Conference on Graphics Interface*, Canadian Information Processing Society Quebec Canada, pp. 65-71. Users were asked to follow a highlighted path and select the highlighted target. The hierarchy of the menus for the above task was limited to second level menus. The evaluation showed that EMUs allow cascaded items to be selected up to 29% faster than traditional menus.

The problem with this technique is that the activation area is enlarged depending on the density of the cascading items in the parent menu. As a result, in case of adjacent cascading items, the size of the activation area will be equal to that of the traditional cascading menu, offering no performance benefits. Also, users can be distracted when a child cascading menu appears while they are targeting a non-cascading item that lies within the enlarged activation area. Fitts' Law also predicts that target acquisition can be improved by increasing the size of the target. Fisheye menus as described in Bederson, B. B., Nov. 6-8, 2000. Fisheye menus. In: *UIST '00: Proceedings of the 13th Annual ACM Symposium on User Interface Software and Technology.* ACM Press, San Diego, Calif., United States, pp. 217-225 and bubble cursors as described in Kobayashi, M., Igarashi, T., Nov. 2-5, 2003. Considering the direction of cursor movement for efficient traversal of cascading menus. In: *UIST '03: Proceedings of the 16th Annual ACM Symposium on User Interface Software and Technology*. ACM Press Vancouver Canada, pp. 91-94 are examples of such techniques. Fisheye menus dynamically increase the size of the target as the cursor approaches it as described in Bederson, B. B., Nov. 6-8, 2000. Fisheye menus. In: *UIST '00: Proceedings of the 13th Annual ACM Symposium on User Interface Software and Technology*. ACM Press San Diego, Calif. United States, pp. 217-225. They allow many items to be listed on one screen and are a good solution for viewing on small devices like personal digital assistants (PDAs). However, the evaluation of fisheye menus 141 showed them to be slower than traditional cascading menus as described in Bederson, B. B., Nov. 6-8, 2000. Fisheye menus. In: *UIST '00: Proceedings of the 13th Annual ACM Symposium on User Interface Software and Technology*. ACM Press, San Diego Calif., United States, pp. 217-225. Bubble cursors as described in Kobayashi, M., Igarashi, T., Nov. 2-5, 2003. Considering the direction of cursor movement for efficient traversal of cascading menus. In: *UIST '03: Proceedings of the 16th Annual ACM Symposium on User Interface Software and Technology*. ACM Press, Vancouver, Canada, pp. 91-94 increase the size of the cursor's activation area at runtime until it encloses at least one target. Bubble cursors are efficient for abstract targeting tasks, such as in computer games where the large cursor area helps in quick capturing of a smaller and fast moving object. However, bubble cursor offers no benefits in discrete targeting tasks where the target item is static and the location is known. An example of such a task is menu selection using cascading pull-down menus.

A further improvement to the method of improving item selection in cascading drop-down menus is disclosed in the article AAMU: Adaptive Activation Area Menus for Improving Selection in Cascading Pull-Down Menus by Tanvir, E., Cullen, J., Irani, P., and Cockburn, A., and which was published in April 2008 in CHI '08: Proceeding of the twenty-sixth annual SIGCHI conference on Human factors in computing systems by ACM, New, N.Y., USA, pp. 1381-1384. In this article, a triangular activation area is described which spans between an apex at a first end at the parent menu object and a second end spanning the height of the associated submenu. The results indicate that user can efficiently perform menu selection when provided with a broader steering path between the parent menu object and a submenu object which is desired to be selected; however, in some instances user may become undesirably trapped within the activation area.

SUMMARY OF THE INVENTION

According to one aspect of the invention there is provided a method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the object area of said one of the parent menu objects in the display;

providing an activation area in the display which is associated with the submenu in which the activation area spans generally in a working direction between a first end adjacent said one of the parent menu objects and a second end adjacent the submenu associated with said one of the parent menu objects;

continuing to display the submenu associated with said one of the parent menu objects while the cursor remains in contact with the associated activation area; and hiding the submenu in the display by performing an override function with the pointing device while the cursor remains in contact with the activation area associated with the submenu.

The override function provides users with an efficient method of overcoming the trapping problem which may occur in the prior art configurations of the activation area.

When the pointing device includes a click function associated therewith, the method may include performing the override function by using the click function of the pointing device.

Alternatively, the override function may be provided by hovering the cursor in a fixed position in contact with the object area of a different one of the parent menu objects which is overlapped by the activation area. In this instance, a hover icon may be provided which overlaps said different one of the parent menu objects when the cursor is in contact with said different one of the parent menu objects so that the override function is performed by hovering the cursor in contact with the hover icon.

The selectable objects may be displayed as a linear cascading menu, or alternatively a pie menu or marking menu.

According to a second aspect of the present invention there is provided a method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the object area of said one of the parent menu objects in the display;

providing an activation area in the display which is associated with the submenu in which the activation area spans generally in a working direction between a first end adjacent said one of the parent menu objects and a second end adjacent the submenu associated with said one of the parent menu objects;

continuing to display the submenu associated with said one of the parent menu objects while the cursor remains in contact with the associated activation area; and shaping the activation area to comprise two opposing side edges extending between the first end and the second end of the activation which diverge from one another from the first end to the second end and which are curved inwardly so as to be generally concave.

The opposing concave edges of the activation area also overcomes some of the trapping problems which may occur in the prior art configurations by minimizing the size of the activation area adjacent the parent menu object, which in turn minimizes the opportunity for the user to enter the activation area when it is not desired to do so.

The activation area is preferably shaped to be generally triangular such that the two opposing side edges are joined with one another at an apex at the first end of the activation area.

The first end of the activation area is preferably spaced from the cursor towards the submenu with which the activation area is associated by a distance in the order of the width of a few pixels of the display.

The activation area may be shaped such that the two opposing side edges are substantially symmetrical with one another.

According to a further aspect of the present invention there is provided a method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the object area of said one of the parent menu objects in the display;

providing an activation area in the display which is associated with the submenu in which the activation area spans generally in a working direction between a first end adjacent said one of the parent menu objects and a second end adjacent the submenu associated with said one of the parent menu objects;

continuing to display the submenu associated with said one of the parent menu objects while the cursor remains in contact with the associated activation area; and varying a characteristic of the activation area in response to a previous menu navigating motion pattern received from a user through the pointing device.

The method may include varying a characteristic of the activation area by varying a shape of the activation area.

When the activation area comprises two opposing side edges extending between the first end and the second end of the activation which diverge from one another from the first end to the second end, the characteristic of the activation area which is varied preferably comprises a width of the activation area between the two opposing side edges in proximity to the first end. At the second end, the width in a lateral direction between the two opposing side edges is typically substantially equal to a corresponding dimension of the submenu in the lateral direction.

The method may include increasing the width between the two opposing side edges in proximity to the first end when the previous menu navigating motion pattern corresponds to a previous movement of the cursor along a path which exits the activation area while attempting to select one of the submenu objects.

The method may also include decreasing the width between the two opposing side edges in proximity to the first end when the previous menu navigating motion pattern corresponds to a previous movement of the cursor along a path which is spaced inwardly from both of the two opposing side edges.

By varying a characteristic of the activation area in response to previous menu navigating motion patterns, the shape of the activation area is customized to a user. The shape and size of the activation area can thus be optimally balanced between minimizing trapping errors by minimizing the size of the area while also minimizing corner steering errors by having a sufficiently wide area that the user doesn't unintentionally exit the area.

One embodiment of the invention will now be described in conjunction with the accompanying drawings in which:

BRIEF DESCRIPTION OF THE DRAWINGS

FIG. 6*a* is an illustration of a centrally-aligned child cascading menu and FIG. 6*b* is an illustration of a top-aligned child cascading menu.

In the drawings like characters of reference indicate corresponding parts in the different figures.

DETAILED DESCRIPTION

Figure 8:
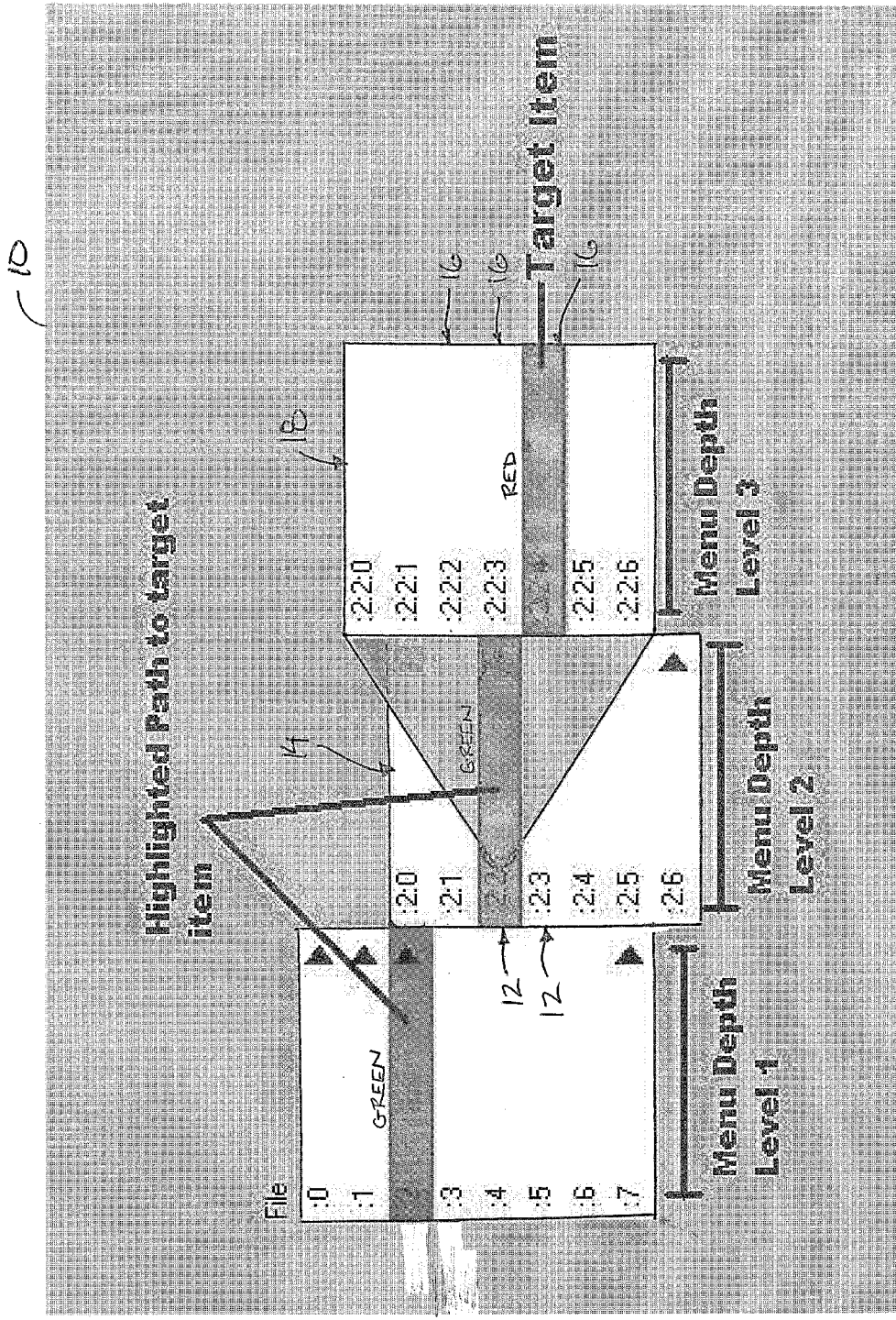
FIG. 8 is an illustration of an example of a 3-level-deep selection task according to experiment 1 in which the target item and the path are shown highlighted.
Figure 15:
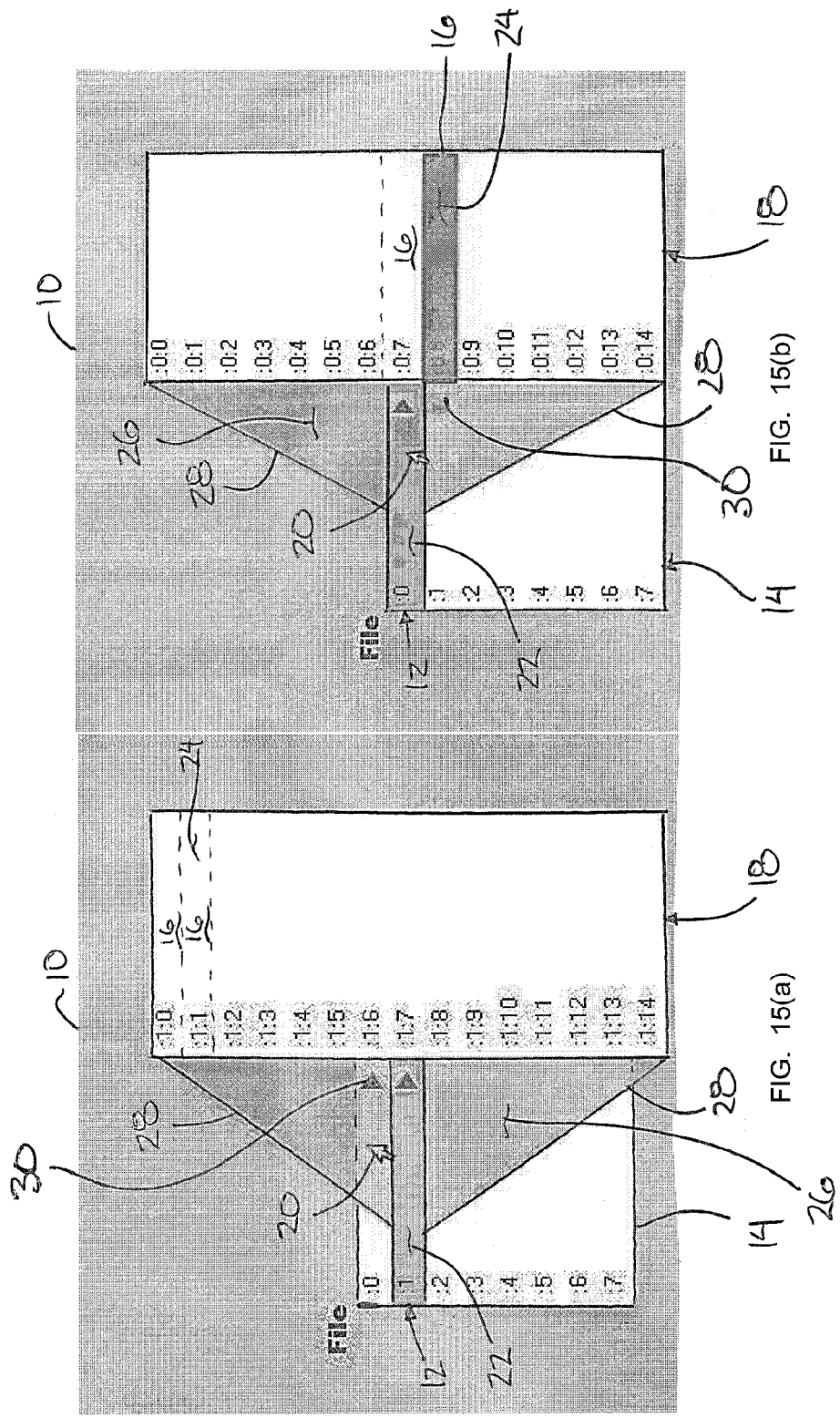
FIGS. 15*a* and 15*b* are respective examples of AAMU Click before the click action in which the cursor is trapped inside activation area of item 1 whereas the desired submenu is associated with item 0, and after click action showing that while staying inside the old activation area the user clicked on item 0 and activated it.

Referring initially to the FIGS. 8, 15(*a*) through 19, and 24 there is illustrated a selectable object display generally indicated by reference numeral 10. The display 10 is arranged for displaying selectable objects in a hierarchy including parent menu objects 12 arranged to be displayed in a parent menu 14 and a plurality of sub-menu objects 16 arranged to be displayed in respective sub-menus 18 in which each sub-menu is associated with a respective one of the parent menu objects of the parent menu.

Although a plurality of embodiments are described in the accompanying specification, the common features of the various embodiments will first be described.

In each instance the display 10 is used in association with a pointing device of the type which controls a position of a cursor 20 within the display. The pointing device further comprises a click function in the form of a button which permits a user input to select objects in contact with the cursor 20.

The method of the present invention relates to the displaying of the parent menu objects in a parent menu such that each parent menu object occupies a respective object area 22 such that contact of the cursor with the object area permits the parent menu object to be selected. The sub-menu associated with each parent menu object is arranged to be displayed only upon contact of the cursor with the respective object area. When the sub-menu is displayed, each sub-menu object similarly includes a respective object area 24 which can be selected by contacting the cursor with the object area and performing the click function of the pointing device.

In the illustrated embodiment, the menus comprise linear cascading menus in which the parent menu objects are displayed as a first list of objects in series with one another in a first row. Similarly each sub-menu is displayed as a second list of objects in series with one another in a respective second row extending alongside and adjacent to the parent menu. In further embodiments, the menus may comprise pie menus or marking menus instead of linear cascading menus as in the illustrated embodiments.

Each sub-menu of the display 10 further comprises an activation area 26 provided by the method of the present invention. The activation area comprises a generally triangular area which is typically semi-transparent and which overlaps at least a portion of the associated parent menu object as well as adjacent and different ones of the parent menu objects when activated to appear together with the associated sub-menu only when the sub-menu appears.

The activation area 26 generally spans in a working direction from a first end adjacent the initial cursor position at the parent menu object being selected to an opposing second end at the sub-menu. The activation area includes two opposing side edges 28 which extend generally in the working direction from the first end where the two side edges are joined at an apex to the second end where the two side edges 28 are spaced apart in a lateral direction perpendicular to the working direction a distance corresponding approximately to the height of the sub-menu in said lateral direction. Accordingly, the two opposing side edges 28 diverge from one another from the first end to the second end. The function of the activation area is to cause the sub-menu associated therewith to remain displayed as long as the cursor remains in contact with the activation area between the boundaries of the two opposing side edges 28 thereof.

The various embodiments described in the following relate to various improvements to avoid trapping of the cursor within the activation area when it is desired to display a different sub-menu with a different activation area therewith while also minimizing steering errors when it is desired to maintain the display of the sub-menu until a respective sub-menu object is selected as desired.

Turning now to the first embodiment, the method of displaying the selectable objects in the display includes an additional override function using the click function of the pointing device to hide the sub-menu displayed even while the cursor remains in contact with the activation area associated with that sub-menu. In this instance, the cursor is aligned with an adjacent one of the parent menu objects which is overlapped by the activation area as the click function is executed to result in the current sub-menu and associated activation area being hidden so that the sub-menu and new activation area of the sub-menu associated with the adjacent parent menu object overlapped by the cursor can be displayed.

According to a second embodiment as shown in FIG. 15 a variation of the override function for hiding the sub-menu in the display while the cursor remains in contact with the activation area is described. In this instance positioning of the cursor over an adjacent parent menu object different from the parent menu object with which the activation area and sub-menu are associated with causes a hover icon 30 to be displayed in overlapping configuration with that adjacent parent menu object. In this instance, aligning the cursor in contact or in overlapping configuration with the hover icon and maintaining the cursor in fixed position in contact with the hover icon for a prescribed duration causes the override function to be enabled. Accordingly the new sub-menu and new activation area of the adjacent parent menu object associated with the hover icon can then be displayed.

Figure 24:
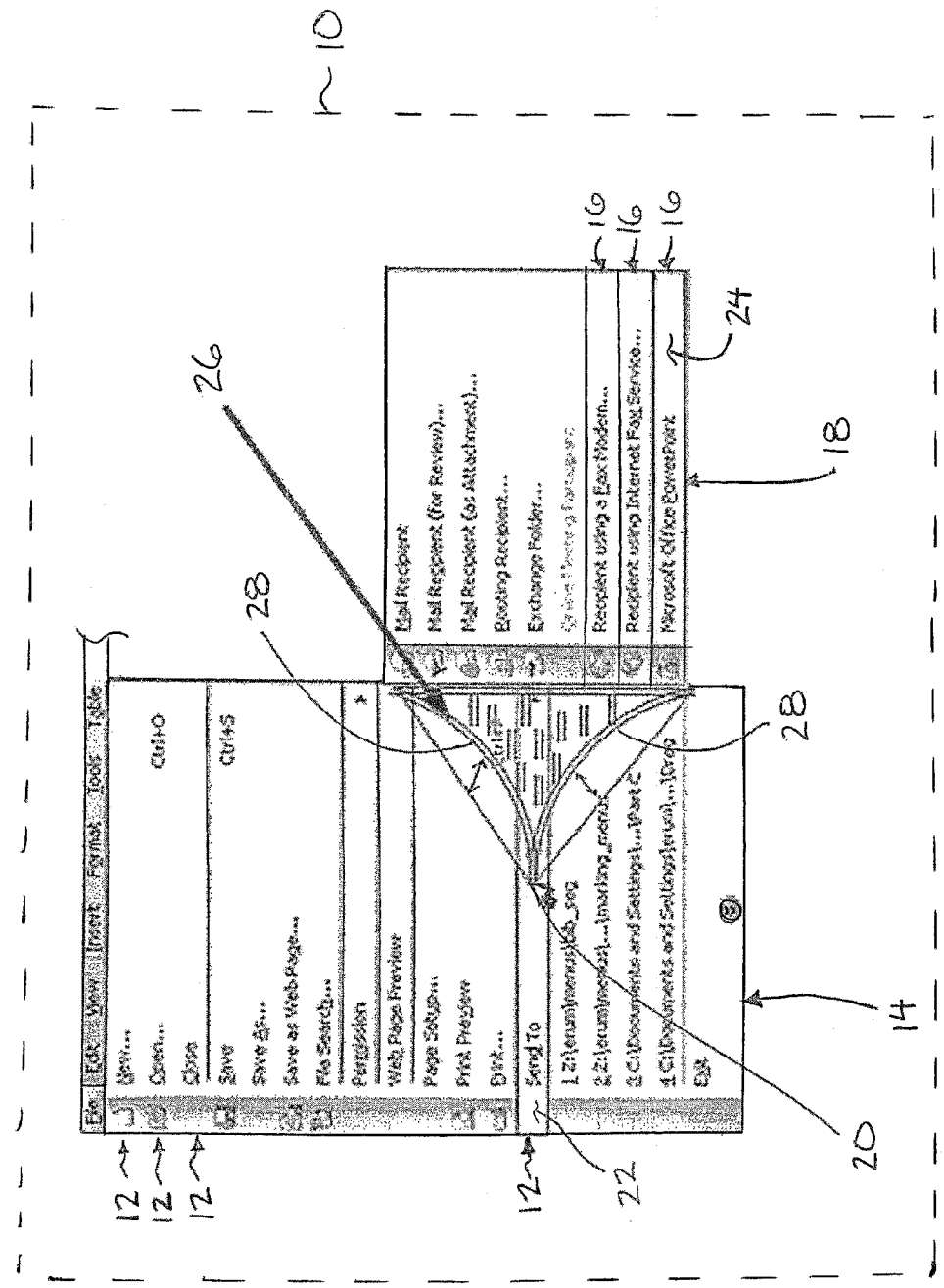
FIG. 24 is an illustration of AAMU showing the outer edges of the triangle can be collapsed into a curved shape to match users' trajectory.

Turning now to FIG. 24, a further embodiment of the activation area is shown in which the two opposing side edges 28 remain diverging from an apex at the first end to a second end spanning the height of the sub-menu in the lateral direction, however the shape of the two opposing side edges is varied so that the side edges may be curved in profile. In the illustrated embodiment, the side edges 28 form a concave boundary of the activation area between the first and second ends so that the two opposing side edges are curved inwardly towards one another.

The third embodiment is also distinguished in that the position of the first end of the activation area and accordingly the size of the activation area is determined by the cursor position each time the activation area is displayed. In particular, the first end of the activation area is positioned to be spaced from the cursor in the working direction towards the second end at the sub-menu. The space between the cursor and the first end of the actuation area typically comprises the distance of just a few pixels of the display which corresponds approximately to an overall width of the cursor shown in the display.

In some instance, the shape and size of the activation area may vary as the cursor is displaced towards the submenu. In particular, it may be desirable for the apex at the first end to be displaced towards the submenu together with forward movement of the cursor towards the submenu to reduce the size of the activation area in response to forward movement. In this instance, any reverse movement away from the submenu will cause the cursor to immediate exit the new boundary of the activation area so that reverse movements function to avoid trapping of the cursor undesirably within the activation area.

When the sub-menu is aligned in the lateral direction corresponding to the width between the two opposing side edges so as to be centered relative to the associated parent menu object, the two opposing side edges 28 are typically symmetrical with one another about a central axis extending through the apex from the first end to the second end.

The shape and size of the activation area of the third embodiment can further by dynamically changed according to one or more previous menu navigating motion patterns which are input by the user with the pointing device. Typically, the height in the lateral direction between the opposing side edges at the second end remains fixed to correspond to the height of the sub-menu while the first end remains an apex where the two side edges are joined, however, the width between the two side edges at an intermediate location between the first and second ends is adjusted to optimally correspond with the typical usage of the user.

The method and device for displaying the selectable objects in this instance includes an additional monitoring function which tracks the motion patterns of the cursor movement which are input by user movements of the pointing device while navigating through the menus. The monitoring function may track the history of various attempts to select different parent menu objects and different sub-menu objects. The various attempts are typically determined to be either successful attempts or problematic attempts where errors in navigating or trapping of the cursor within the activation area are evident.

For successful navigating attempts in selecting objects, a distance between the path of the cursor movement in the working direction relative to the two opposing side edges of the activation area is considered. If there is a large gap between the cursor path and the side edges such that the path is spaced inwardly from both side edges, the system can adjust the size of the activation area by decreasing the width between the two opposing side edges. Typically the reduction of the width between the two side edges is most prominent in proximity to the first end of the activation area when the opposing side edges are concave as shown in FIG. 24.

Alternatively where the cursor path follows closely alongside one of the two opposing side edges without inadvertently crossing the boundary of the activation area, the system typically determines that the activation area is appropriately sized and no further changes to the activation area are made.

When the previous motion patterns indicate that a user attempting to navigate to a sub-menu object frequently crosses the boundary of the associated activation area, the width between the two opposing side edges is typically increased primarily in proximity to the first end of the activation area in subsequent displays of the activation area to reduce future errors. Similarly, if the previous motion patterns of the user indicate that the user input extreme direction changes typically indicative of a trapping problem, the width of the activation area between the opposing side edges can also be decreased in subsequent displays of the activation area.

If it is evident from the motion patterns of the user that there are frequent problems with activation areas for a parent menu object being displayed where it is desirable for the user to select a different adjacent one of the parent menu objects, the system may vary the width of the activation area. Furthermore where the user patterns indicate that a particular user prefers motion patterns which do not correspond to a generally triangular activation area, the overall shape of the area may be varied. For example the width adjacent the first end may be decreased while simultaneously the width adjacent the second end is increased to correspond with the user motion patterns. The reverse of increasing width at the first end while decreasing width at the second end can also be accomplished if desired.

The Adaptive Activation Area Menus (AAMUs) described herein, improve upon existing techniques for cascading menus by providing users with broader paths to quickly reach the submenus, even in situations with multiple adjacent cascading items. This broad activation path is provided without introducing a time delay.

Figures 7A, 7B, 7C:
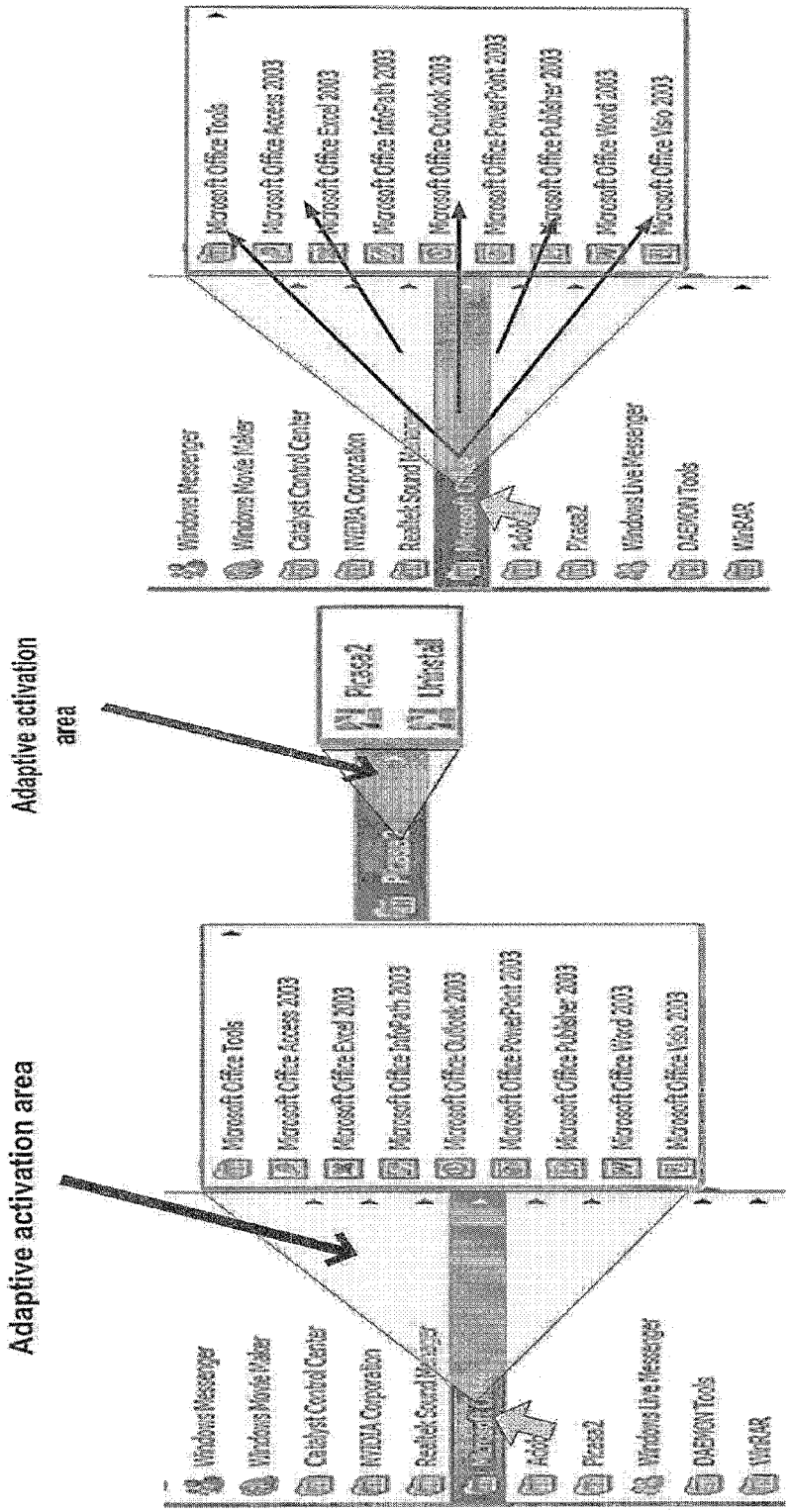
FIGS. 7*a*, 7*b* and 7*c* are examples of adaptive activation areas demonstrating a long child cascading menu, a small child cascading menu, and diagonal steering paths respectively.

AAMUs, shown in FIG. 7, provide users with a broad steering path by means of adaptive activation areas. The size of the activation area is dynamically determined depending on the size of the child cascading menu and position of the cursor. This activation area is triangular in shape and overlaps some area of the adjacent menu items; however, the activation area is semitransparent allowing the users to see all items in the parent menu. The broader activation area provides a means to remove the time delay before a cascading submenu is posted, because the activation area removes the ambiguity of the user's intentions.

Figure 1:
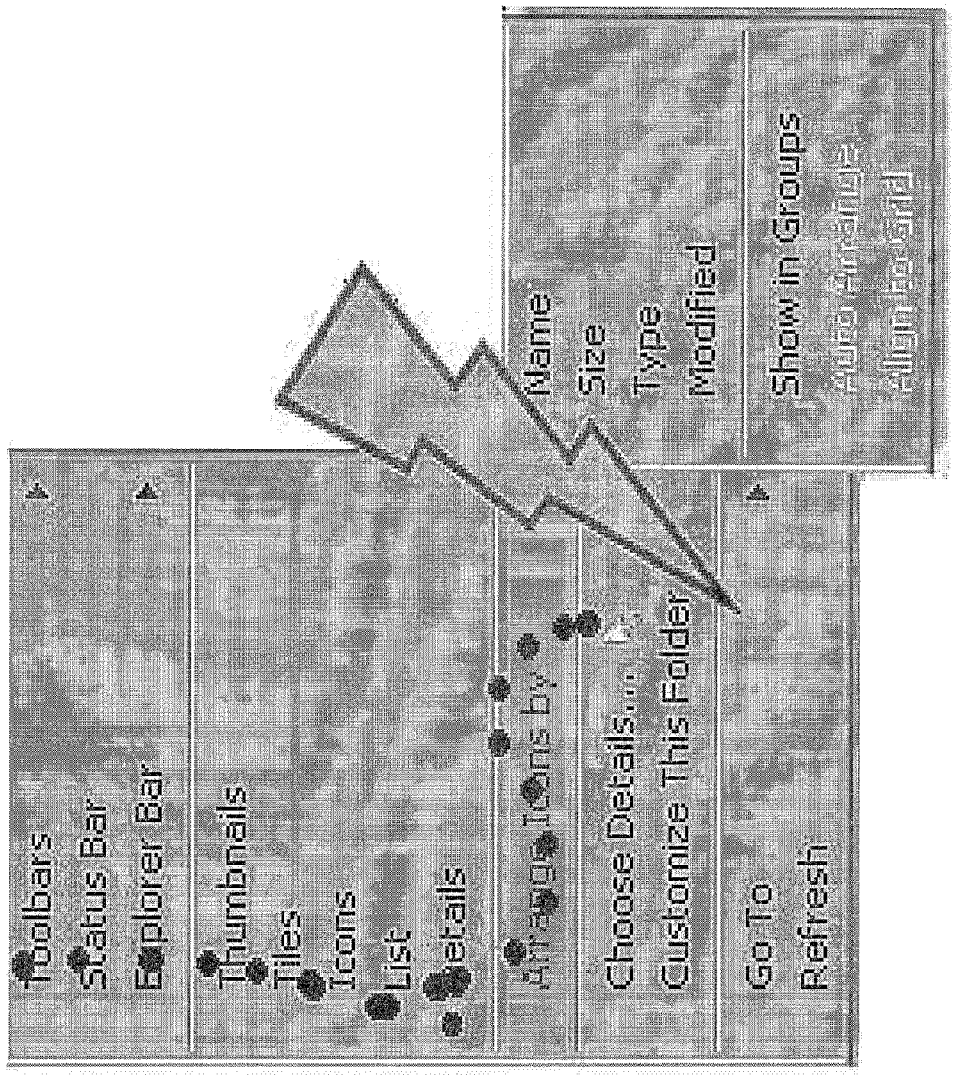
FIG. 1 is an illustration of an elongated movement path in a menu causing a movement error in which the submenu appears unexpectedly as the cursor crosses the border of the upper item.
Figure 2:
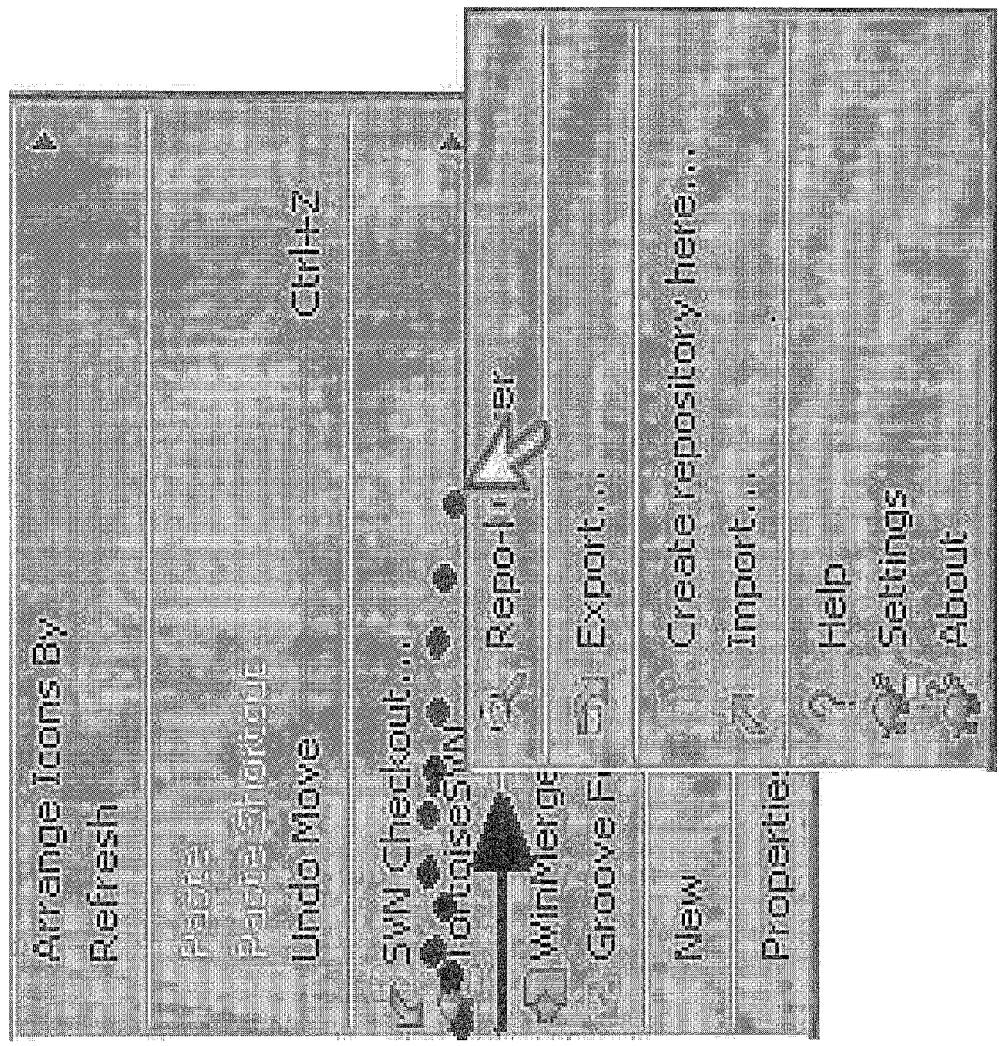
FIG. 2 is an illustration of a menu showing an existing technique known as direction-based cascading menus in which horizontal motion towards the right opens a submenu near the cursor position.
Figure 3:
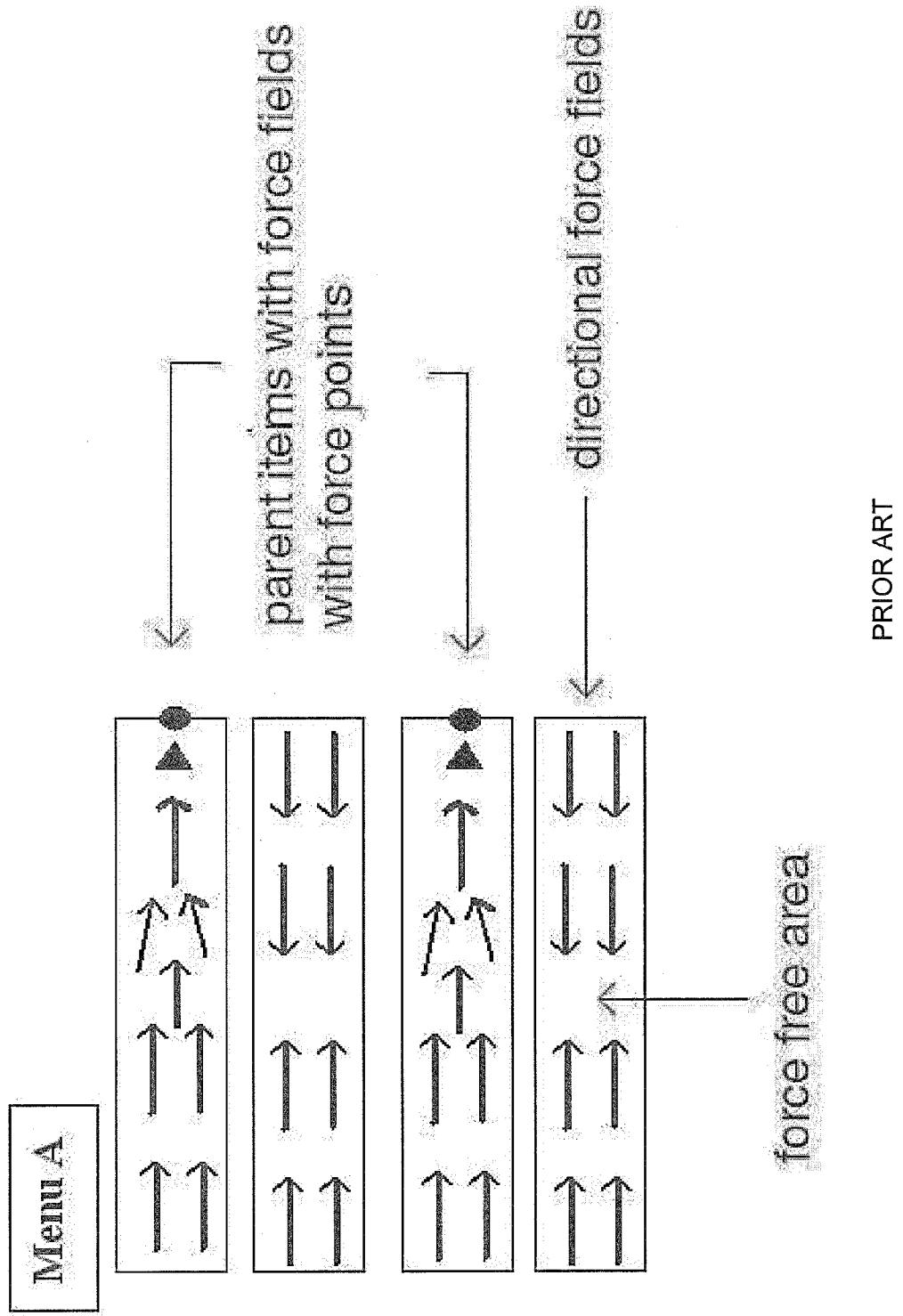
FIG. 3 is a schematic representation of another existing technique in which cascading pull-down menus use force fields.
Figure 4:
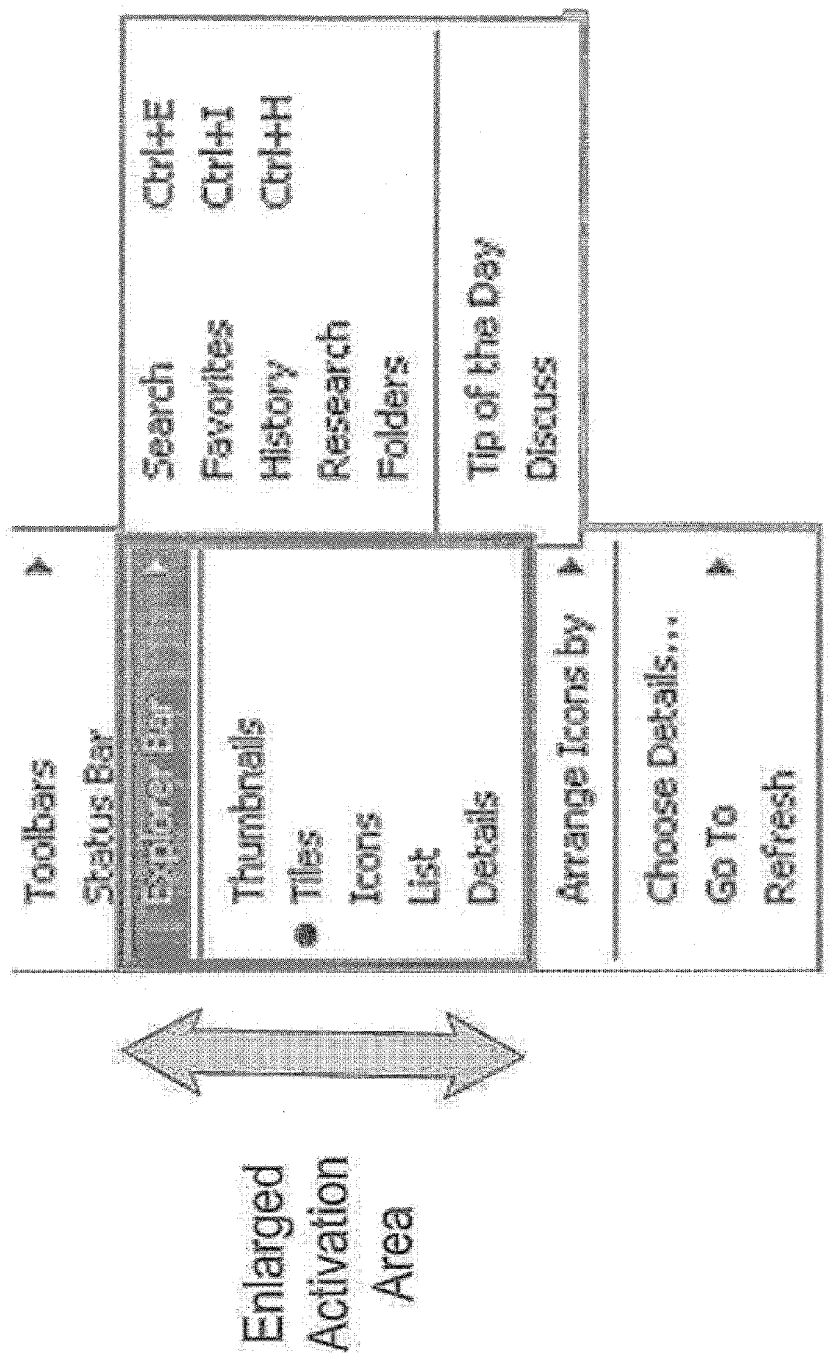
FIG. 4 is a schematic representation of an enlarged activation-area menu.
Figure 5:
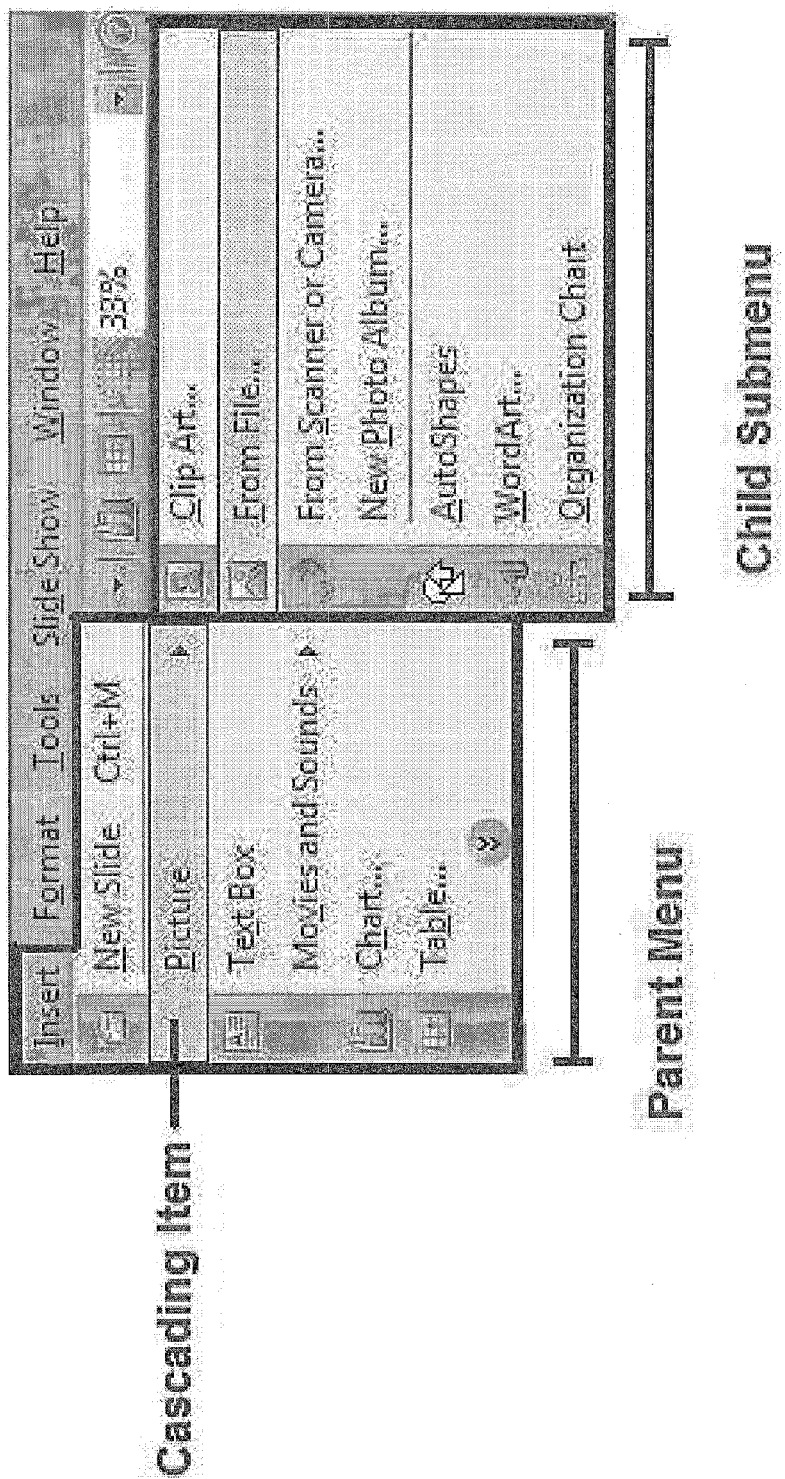
FIG. 5 is an illustration of a two-level deep cascading pull down menu.
Figure 6B:
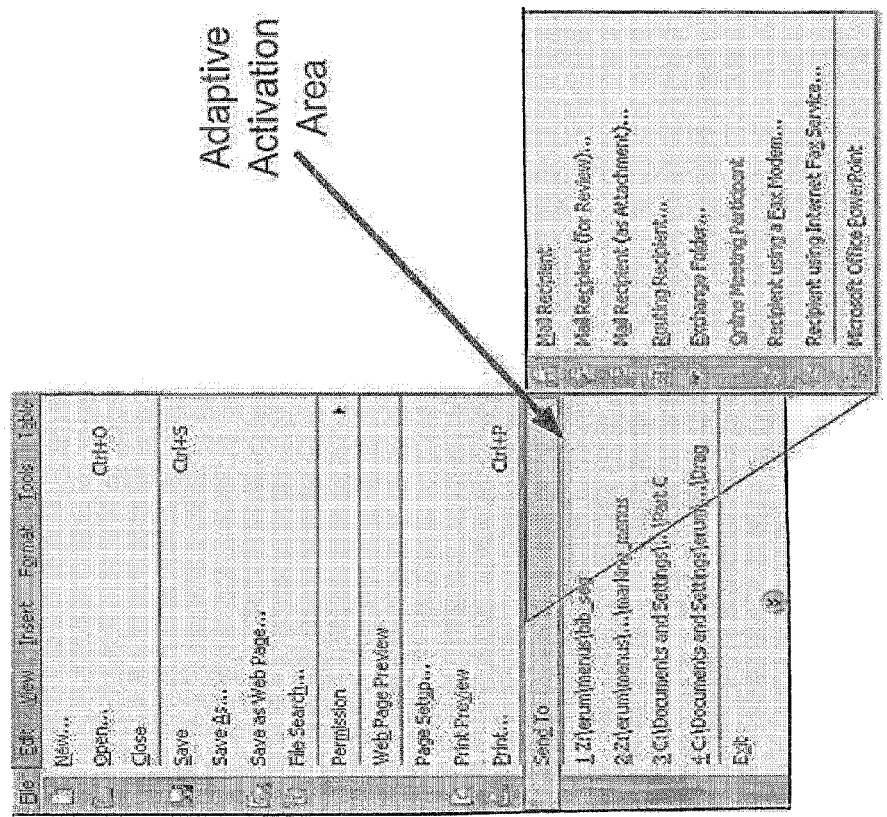

As an AAMU adapts to the size of the child submenu and initial cursor position, there are two different submenu alignments possible:

Center-Aligned: If the size of the child menu permits, i.e., if there is enough space available at the top of the cascading item, then the child submenu is placed such that half of its height is above and half is below the cascading item. Hence, the name center-aligned, see FIG. 6(*a*).

Top-Aligned: If the child submenu is too long to be placed centrally, then its top is aligned with the top of cascading item. Hence, the name top-aligned, see FIG. 6(*b*).

The AAMU technique works as follows. When the user rests the cursor on a cascading item, a transparent activation area is invoked near to the cursor along with the child submenu. The activation area adapts its size to the number of items in the child menu and the position of the cursor. To choose a submenu item, the user can move diagonally towards the child cascading menu. The activation area and child submenu remains posted as long as the cursor remains inside the triangular activation area (see FIG. 7(*b*)). To activate another item in the parent menu, the user has to move his/her cursor outside the boundaries of the current activation area, which will cause the activation are to disappear.

AAMUs offer three potential advantages. First, the broader activation area permits diagonal movements, which avoids the problem of steering through elongated paths and sharp corner steering. Second, as opposed to EMUs, users can benefit from a wide activation area even cases of adjacent parent items. Finally, there is no time delay involved in posting a submenu.

User Studies to Evaluate AAMUs

Experiment 1: Selection with Mouse

In our initial validation of AAMUs, we compared AAMUs to the following existing techniques: gesture-based menus (Kobayashi and Igarashi, 2003), enlarged activation area menus (EMUs) (Cockburn and Gin, 2006) and force-fields (Ahlstrom, 2005). To provide a fair comparison, all menu types were implemented without any time delay. Thus in this study we compare AAMUs against the strongest existing cascading menu designs to provide a fair perspective into the merits of each technique.

For the purpose of Experiment 1, we also tested an AAMU variant called force-AAMU, which combines force fields and AAMUs. Force-AAMUs provide the benefit of reduced navigation distance in addition to wide steering paths. Force fields are implemented only within the adaptive activation area. Once the cursor enters the activation area, it is pushed towards the right side. As there are no force fields in the menu items, no resistance is experienced while entering back into a parent menu, unlike in a force fields menu. Experiment 1 and its results originally appeared at CHI 2008 (Tanvir et al., 2008).

Participants:

Eleven university undergraduate students participated in exchange for course credit. All had used the MS Windows default menu and were familiar with operating a mouse. None were color blind.

Conditions:

The following menu types were tested in this study: default, AAMU, force-AAMU, EMU, force-fields and gesture-based. We also tested each of the techniques at cascading depths (i.e., number of levels in the hierarchy) 2, 3 and 4. (see FIG. 8).

Task and Stimuli:

Participants were required to perform 30 menu selection tasks with each technique, with 10 trials at each of three cascading menu depths (2, 3, and 4). The experimental task simulates expert menu use, where the user knows the location of the target item. Specifically, the path to the target menu item was highlighted to the user in green to provide users with a visual cue (see FIG. 8), while the target menu item was displayed to the user in red.

Menu length was varied randomly (between 4 and 9 items) in each level of depth in every trial with a constant cascading density of 50%, where cascading density is the percentage of menu items that are parent items. The target menu item always appeared in the last menu depth level. For each trial, a different path and target position was randomly generated to prevent users from learning the trial path and positioning of the target item. At the start of the experiment, participants were given five minutes of training with each menu type. Participants were instructed to complete tasks as quickly and as accurately as possible.

The order of technique presentation was counterbalanced using a Latin square, while depth was randomized. With 6 menu types, 3 depths, and 10 trials per condition, the system recorded a total of 180 trials for each participant. A post-study questionnaire was also administered to obtain data on participants' preferred techniques. The experiment took approximately 25 minutes.

Apparatus:

The experiment was conducted on Windows XP using a Pentium 4 machine with 1 GB of RAM. The experiment was performed using a mouse.

Design:

The experiment employed a 6×3 factorial design with six interface types (default, AAMU, EMU, Force-Fields, Force-AAMU, and Gesture-Based) and three menu depths (targets at cascading depth 2, 3, or 4).

Results:

The logged dependent variable (task time) was analyzed using a repeated measures analysis of variance (ANOVA) for factors interface type (default, AAMU, EMU, Force-Fields, Force-AAMU, and Gesture-based) and menu depth (targets at cascade depth 2, 3, or 4).

Figure 9:
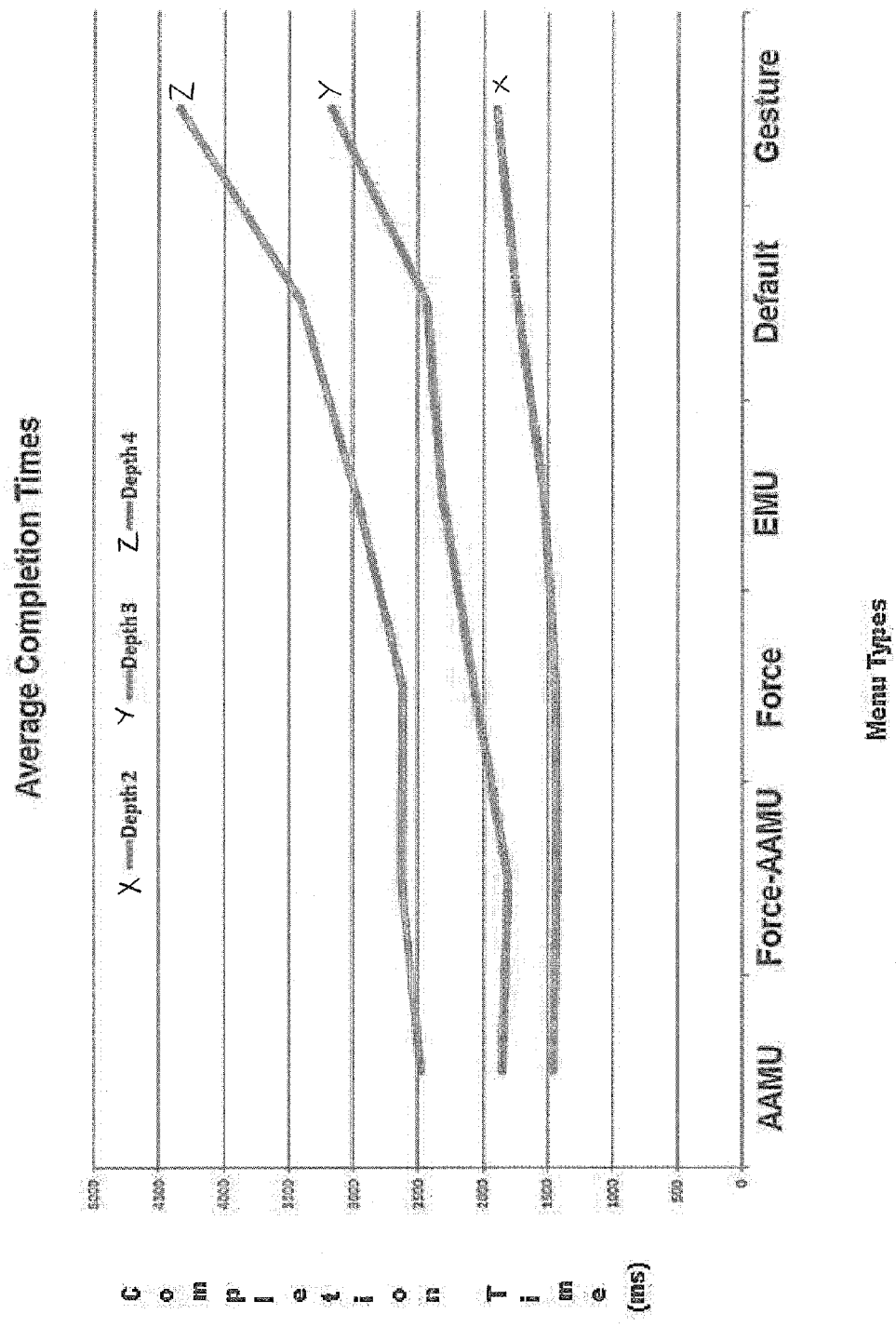
FIG. 9 is a bar graph showing average completion time for different menu types in experiment 1.
Figure 10:
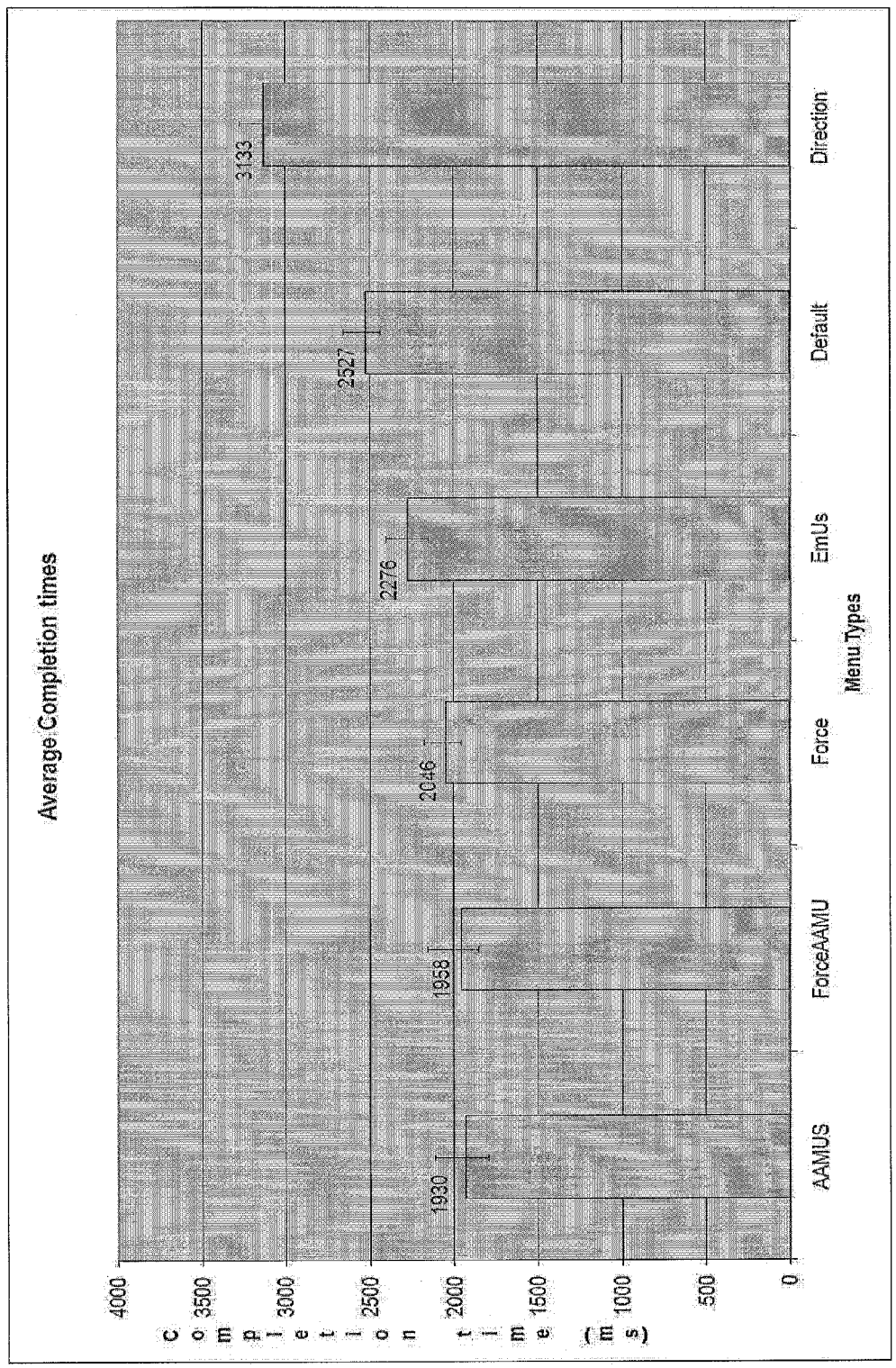
FIG. 10 is an interaction graph showing a rapid decrease in speed with increase in depth, for different menu types in experiment 1.

The overall results for speed are shown in FIG. 9. There was a significant main effect of menu type (F (5,50)=28.5, $p<0.001$). As expected, there was also a significant main effect of depth on speed (F (2,20)=172.4, $p<0.001$). In addition to the main effects, there was a significant menu type× depth inter-action effect (F 10,100)=8.9, $p<0.001$). As illustrated FIG. 10, performance degraded more rapidly across depth with default and gesture-based menus than with the other techniques.

A post-hoc pairwise comparisons, using a Bonferroni adjustment, revealed that AAMU (mean 1.93 s, sd 0.55) and force-AAMU (1.95 s, 0.57) were significantly faster than EMUs (2.28 s, 0.75), default (2.53 s, 0.91) and gesture-based (3.13 s, 1.36). Force-fields (2.04 s, 0.62) was significantly better only than default. There were no significant differences, however, between AAMU, force-AAMU and force-fields. Gesture-based was significantly slower than all other menu types.

Subjective Rankings

Figure 11:
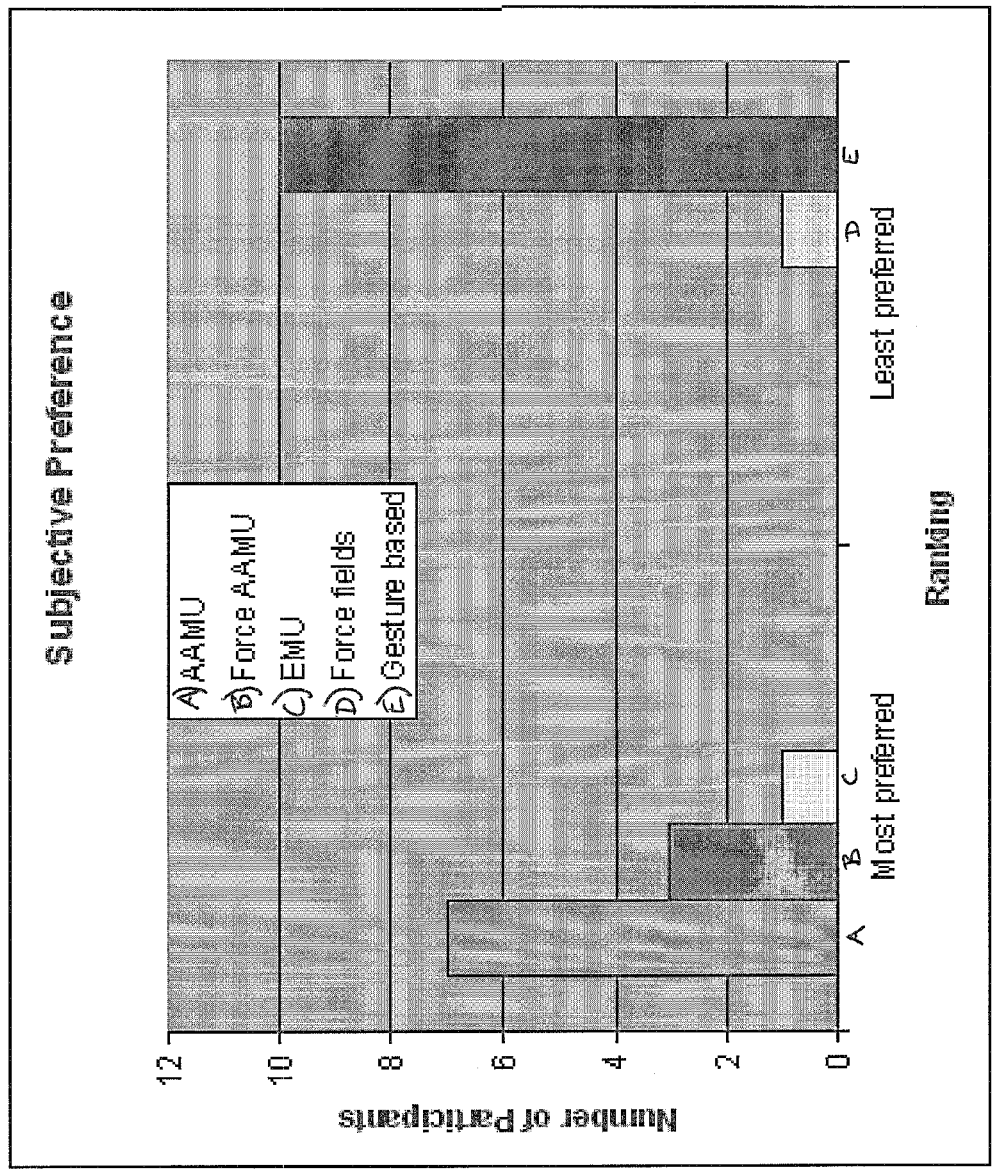
FIG. 11 is a bar graph showing subjective preference for different menu types in experiment 1.

FIG. 11 displays the results of the questionnaire, revealing that AAMU was the most preferred technique, followed by force-AAMU, EMU, Force fields and Gesture based. Overall preference leaned towards any technique that implemented an enlarged activation area, which is a common feature between AAMUs and EMUs (see FIG. 11). Users gave lower preference to EMUs due to the non-uniform activation area, which they found distracting and confusing. Those who did not prefer force field menus commented that they were more familiar with the standard speed of the mouse. The increased cursor acceleration, due to force fields, made it feel as if the control was taken away. The majority of the users disliked the gesture-based menu on the basis that it interfered with the pace of interaction by forcing the user to change their direction of motion during the posting/un-posting invocations.

Discussion:

In a task representative of expert behaviour, our results show that AAMUs outperform traditional menus and EMUs, the latter of which also aims to improve performance by increasing area. Furthermore, AAMUs was the most preferred technique among the five techniques studied. The gestured-based menus performed the worst, both in terms of performance and users' subjective impressions. There were no performance differences between techniques involving force fields and AAMUs, however, feedback obtained during the questionnaire revealed that force fields were generally not well received. Furthermore, force fields do not extend to many common input devices, such as the touchpad and the stylus. In our next study, we examine performance on a task more representative of novice menu behaviour and look at the impact of different input devices on the effectiveness of AAMU technique.

Experiment 2: Search and Multiple Devices

In most real world scenarios users will not always know the location of the target item, often having to search through potentially multiple cascading menus. In Experiment 2, we evaluate the performance benefits of AAMU in this type of search task and examine the impact of three different input devices (mouse, touchpad and stylus).

Participants:

Twenty university undergraduate students participated in exchange for course credit. All of them had used the MS Windows default menus and were familiar with operating a mouse. Ten of the participants had prior experience using a touch pad and had used a stylus. None were color blind.

Conditions:

Based on poor performance and lower subjective rankings in Experiment 1, gesture-based (Kobayashi and Igarashi, 2003) and force-fields (Ahlstrom, 2005) were dropped from this study. While force-AAMUs had some support, this technique does not generalize to stylus-based input. Therefore, we also decided to remove this variant from our investigations. Thus, the following menu types were tested in this study: default, AAMU, and EMU. We also tested 3 device types: mouse, touchpad and stylus).

Task and Stimuli:

Participants were required to perform 20 menu search tasks with each technique, at a fixed menu depth (level 3). Since it was a search task, no visual cue was provided for the path and participants had to activate all cascaded items to search for the target. The target menu item was displayed in red. Menu length was varied randomly (between 4 and 9 items) in each level of depth in every trial with a constant cascading density of 50%. The positioning of the target item was determined randomly, but always appeared in the last menu depth level. For each trial a different path and target were generated to prevent users from learning the trial path and positioning of the target item. At the start of the experiment, the participants were given 5 minutes of training with each menu type. Participants were instructed to complete tasks as quickly and as accurately as possible. The order of presentation was first controlled for menu type and then for depth such that 20 consecutive trials for each menu type with random depths were presented at a time. The order of technique presentation was counterbalanced using a Latin square. With 3 menu types, 1 depth level, 3 devices and 20 trials per condition, the system recorded a total of 180 trials for each participant. The experiment took approximately 25 minutes per participant.

Apparatus:

The experiment was conducted on Windows XP using a Pentium 4 machine with 1 GB of RAM. The experiment was performed using a mouse, touch pad and a stylus.

Design:

The experiment employed a 3×3 factorial design with factors menu type (De-fault, AAMU and EMU) and input device (mouse, touch pad and stylus).

Results:

The logged dependent variable (task time) was analyzed using a 3×3 repeated measures analysis of variance (ANOVA) for factors menu type (Default, AAMU and EMU) and input device (mouse, touch pad and stylus).

Figure 12:
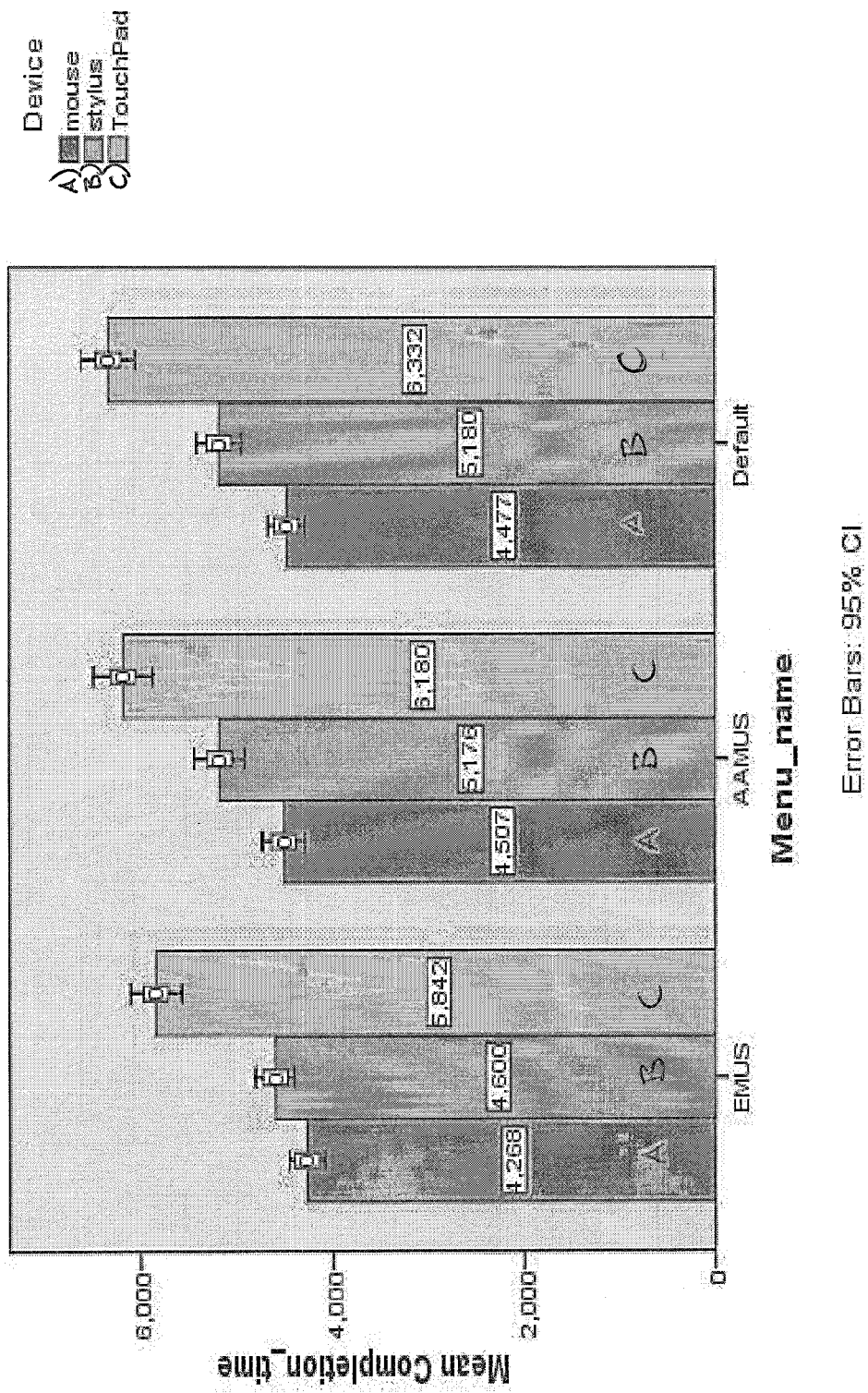
FIG. 12 is a bar graph showing mean completion times with respect to device types in experiment 2.

The mean completion times with respect to menu types and device types are summarized in (FIG. 12). There was a significant main effect of menu type ($F (2,36)=11.668$, $p=0.001$) on completion time. Post-hoc pairwise comparisons, using Bonferroni adjustment, showed EMUs performing significantly faster than default and AAMUs ($p<0.001$ and $p=0.006$), whereas there was no difference among default and AAMUs ($p=1.00$). There was also a significant main effect of device type ($F (2,36)=63.02$, $p<0.001$) on completion time, but no interaction effect between menu type and device type ($F (4,72)=1.510$, $p=0.208$).

Discussion:

In Experiment 1, an item selection task (i.e., expert menu behaviour) showed the promise of the AAMU technique. Experiment 2, however, which involved a searching task, revealed some potential design problems with the AAMU technique as it no longer outperformed default and EMUs. The lack of difference between AAMU and default suggests that some of the benefit of the wider activation area is lost when the user is exploring menus. In particular, when the wider activation area is fully expanded, it covers adjacent items in the parent menu and the user cannot activate the adjacent menu item immediately. We refer to this limitation as the "cursor trapping" problem since the user needs to "get out" of the activation area before entering the next menu item. A second potential problem, which could impact both select and search task, but be more apparent in a search task, is that users might not be taking full advantage of the diagonal movement path because of their prior experience with the corner steering required of traditional cascading menus. We investigate both of these potential concerns in Experiment 3.

Experiment 3: Investigating Movement Trajectories

To investigate the existence of the aforementioned problems, we next collected a number of movement paths from nine participants to examine how users interact with AAMUs both with and without the possibility of trapping. To observe trapped cases we manipulated cascading density, which is the percentage of cascading items within a single level of the menu hierarchy. We included trials with menus of minimal density, with only one cascading item present. Since no trapping can occur in these cases, we refer to these trials as "clear". We also included trials where every item in the first level of the menu hierarchy was cascading (i.e., 100% cascading density), to ensure that trapping would occur. Full descriptions of Experiment 3's methods and analysis can be found in (Tanvir, 2009). Here we summarize the types of movement patterns we observed.

Movement Patterns in "Clear" Trials:

Inspections of users' movement patterns reveal that, in general, users are using the diagonal movement path offered by AAMUs. Despite the prevalence of traditional cascading menus, almost all users showed identical navigation patterns in case of clear trials, making use of the broader activation area and performing diagonal steering.

Figure 13:
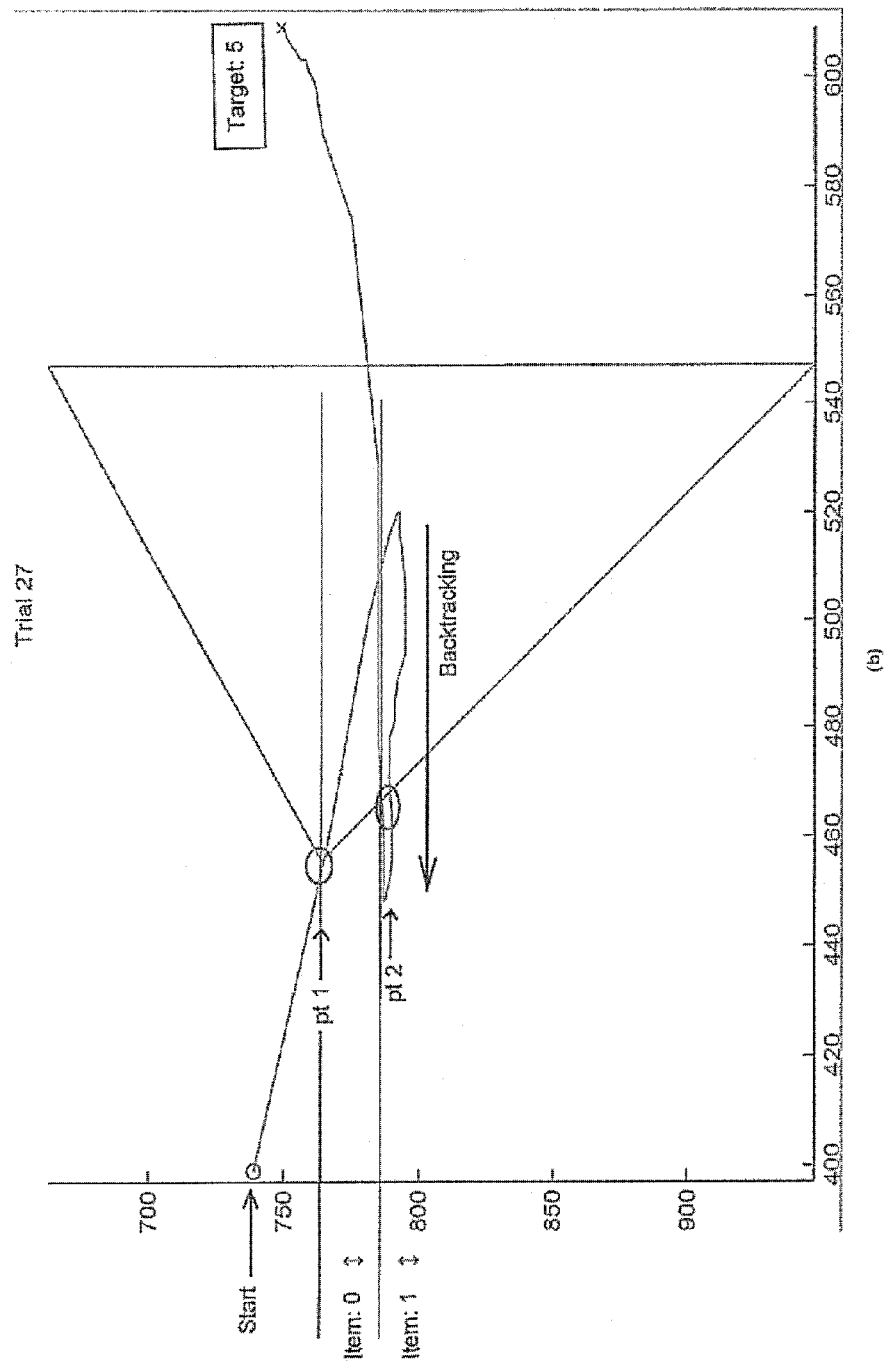
FIG. 13 is a graph showing backtracking of cursor in a trapped trial in which the user got trapped at "pt 1" and had to move all the way back to get out of the wrong AAMU and activate the correct AAMU at "pt 2".

Movement Patterns in Trapped Trials:

In case of trials designed for trapping, we found that, as expected, the majority of these trials actually caused cursor trapping and users had to maneuver the cursor out of the AAMU triangle to select the correct item. Our examination of navigation patterns revealed how disruptive cursor trapping can be. There were all kinds of patterns visible, from back tracking to extreme vertical (upward or downward) cursor movements. FIG. 13 shows an extreme example of the disruption. In this trial the two adjacent parent items were item 0 and item 1. Item 0 was the false parent and item 1 led to the target item that was located at position 5 in the child submenu. As seen in FIG. 13, the user started moving downwards in the parent menu and as soon as the cursor entered the boundaries of item 0, at "pt 1", the respective AAMU was activated. Since the users' motion was diagonal, the cursor moved much inside the triangle before the user realized that it was the wrong item and now the only option left was to move the cursor outside the triangle to deactivate it. So the user back tracked all the way out of the AAMU triangle and as soon as the cursor entered the boundaries of item 1, at "pt 2", the other AAMU activated and it lead to the target item.

Figure 14:
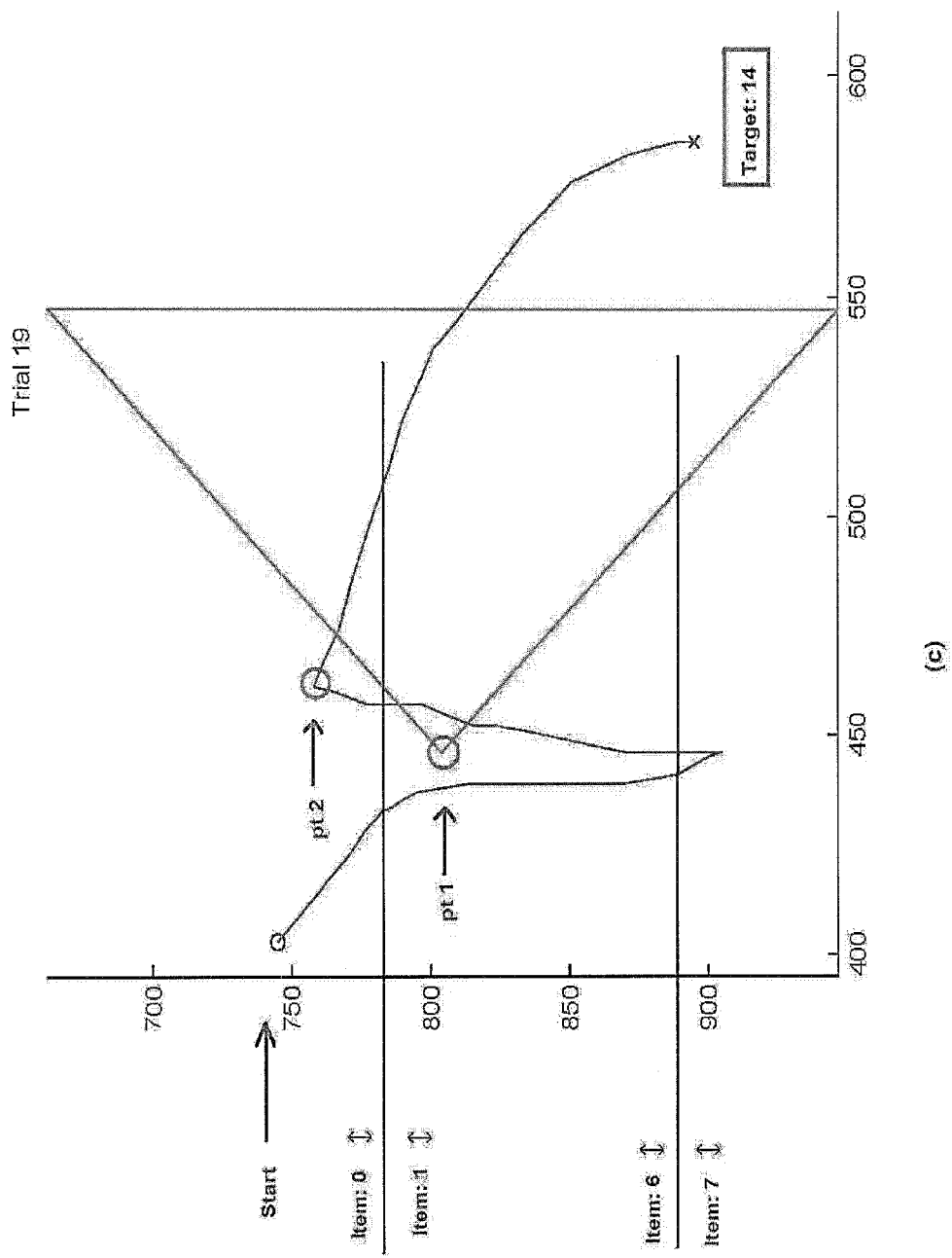
FIG. 14 is a graph showing trap avoidance in a trial in which a quick vertical movement between item 0 and item 7 shows a user is trying to avoid getting trapped by skipping the adjacent parent items.

Trap Avoidance:

In addition to the difficulties users experience when trapped in an AAMU, we also observed the development of coping strategies which would negatively impact future selections. In particular, after getting trapped a few times, almost all users would try to avoid trapping by making extreme vertical (downward or upward) movements. In FIG. 14, the graph shows a navigation pattern of trap avoidance even before any trapping occurred. In the trial, the two adjacent parent items were item 0 and item 1. Since item 0 led to the target item, technically the user was never trapped while moving downwards into the item but having experienced getting trapped in previous trials the user quickly leaped downwards vertically, almost skipping seven items before stopping and moving up again. On the way up, the user activated item 1 at "pt 1", and kept moving the cursor upwards until "item 0" was activated. The user then entered the newly activated AAMU and clicked on the target item.

Developing Alternate AAMU Designs:

The movement patterns illustrate some of the difficulties that users experience concerning cursing trapping with AAMUs. To lessen the performance impact of trapping, we investigated variations of the original AAMU technique that provide alternate paths or shortcuts out of cascading items. We explored the following factors: shape, visual cue and AAMU drawing position, which led to three alternative designs: AAMU-Click, AAMU-Curve and AAMU-Hover.

AAMU-Click appeared identical to traditional AAMUs and it provided a shortcut path (click) to users to get out of the trap. AAMU-Click allowed the users to continue interacting with other items in the menu while staying inside the AAMU triangle: A single click on any item makes the AAMU triangle disappear and activates this current item's function, as shown in FIG. 15.

Figure 16:
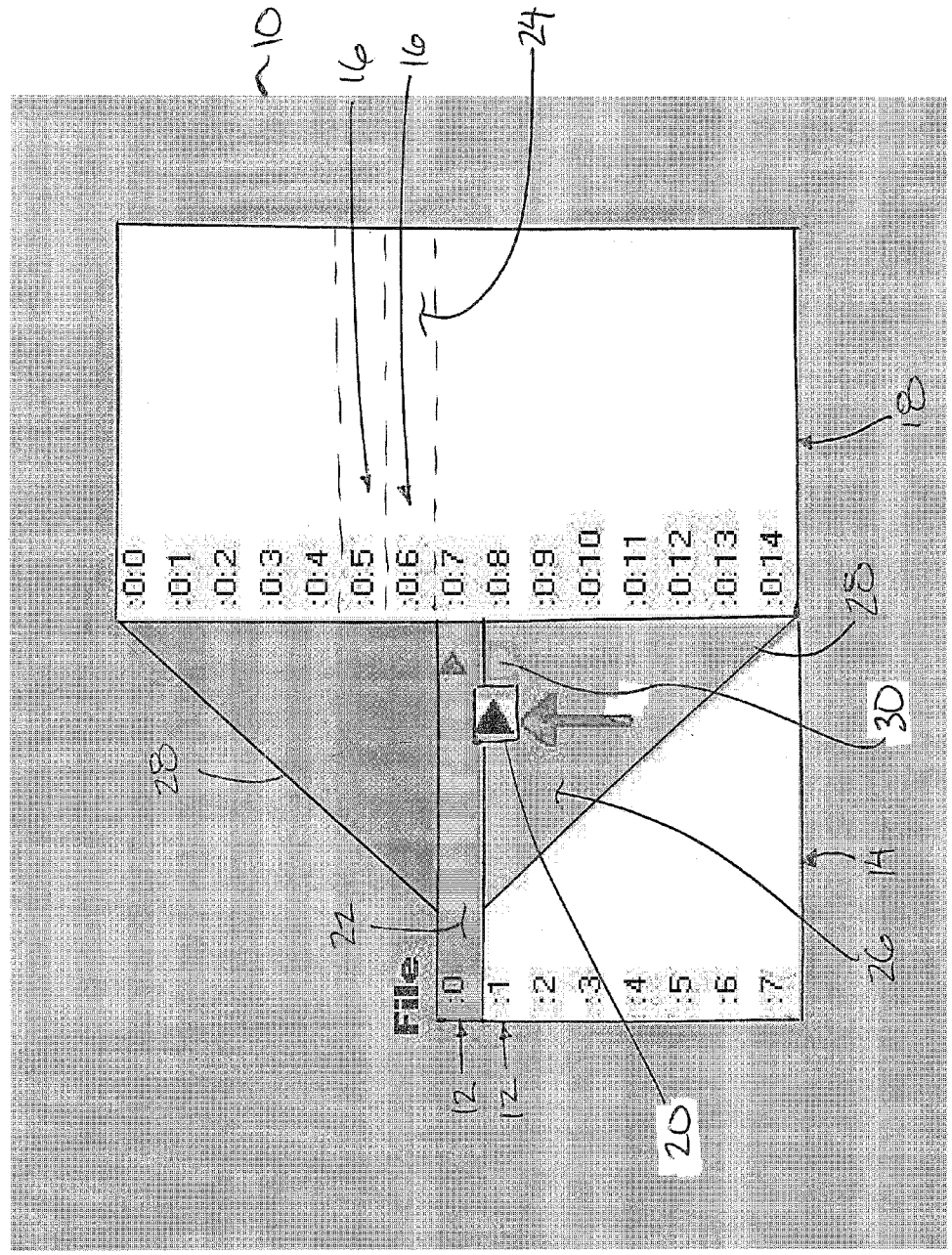
FIG. 16 is an illustration of a two-level deep menu showing AAMU hover.

AAMU-Hover provides users with a visual cue to indicate an alternative path. When the mouse crosses over onto adjacent item that is covered by the AAMU triangle, a small arrow appears inside the AAMU triangle. Hovering the cursor on this arrow activates this next item's function as shown in FIG. 16.

Figure 17:
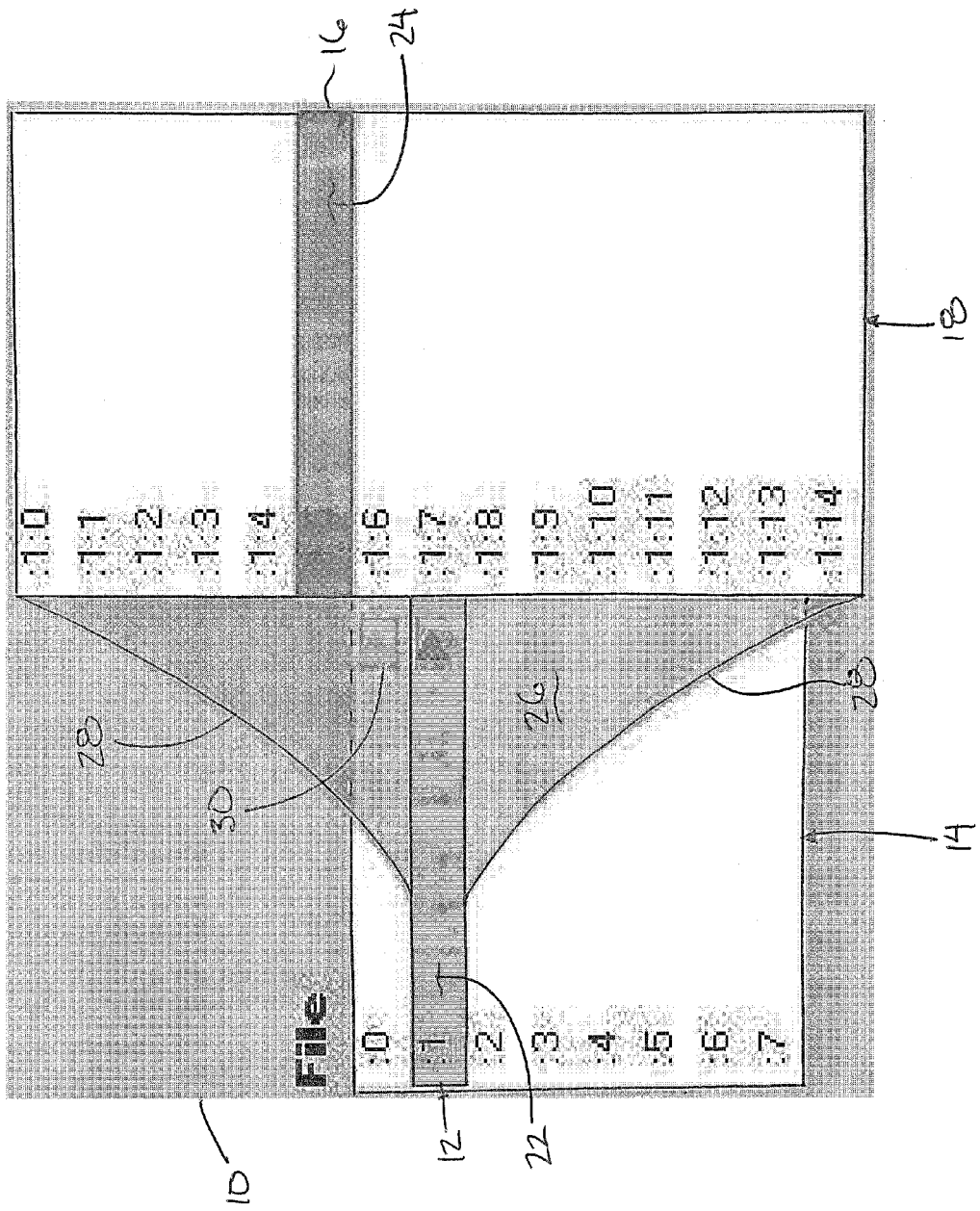
FIG. 17 is an illustration of a two-level deep menu showing AAMU-Curve.

AAMU-Curve is a curved version of traditional AAMUs. Instead of an equilateral triangle, the legs joining the cursor position and the top and the bottom of the child submenu were drawn as curves. This curved triangle is also drawn a few pixels ahead of the cursor, so that user can explore the child submenu without entering the triangle or getting trapped. Even in case of trapping, the narrow tip of the curved shape makes it easier for the user to get out of the triangle serving as a quick shortcut. An example of AAMU-Curve is shown in FIG. 17.

We tested each of the above three alternative designs in a pilot study with 25 participants. The results of this study, which is described in detail in (Tanvir, 2009), suggested that AAMU-Curve and AAMU-Click both had potential to improve on the trapping problems and were preferable to AAMU-Hover. A major problem with the hover technique was that the arrow would appear on all diagonal movements, even when users were not actually trapped, at times causing unintended submenu invocations/revocations when the users accidentally hovered on the arrow while navigating. On the other hand, both AAMU-Curve and AAMU-Click showed promise:

We found that the curve shape helped in the search task, whereas the click helped in the selection task. Therefore, in our final experiment, we combine the curve shape and the click functionality in an AAMU-Curve-Click design to leverage the respective advantages of both designs.

Experiment 4: Putting the Best Designs to the Final Test

A controlled experiment was conducted to evaluate the benefits of AAMUs and its variant, AAMU-Curve-Click, against default and EMU technique.

Participants:

39 undergraduate students participated in the experiment in exchange for course credit. All participants were experienced computer users, using mouse on a daily basis. None were color blind.

Figure 18:
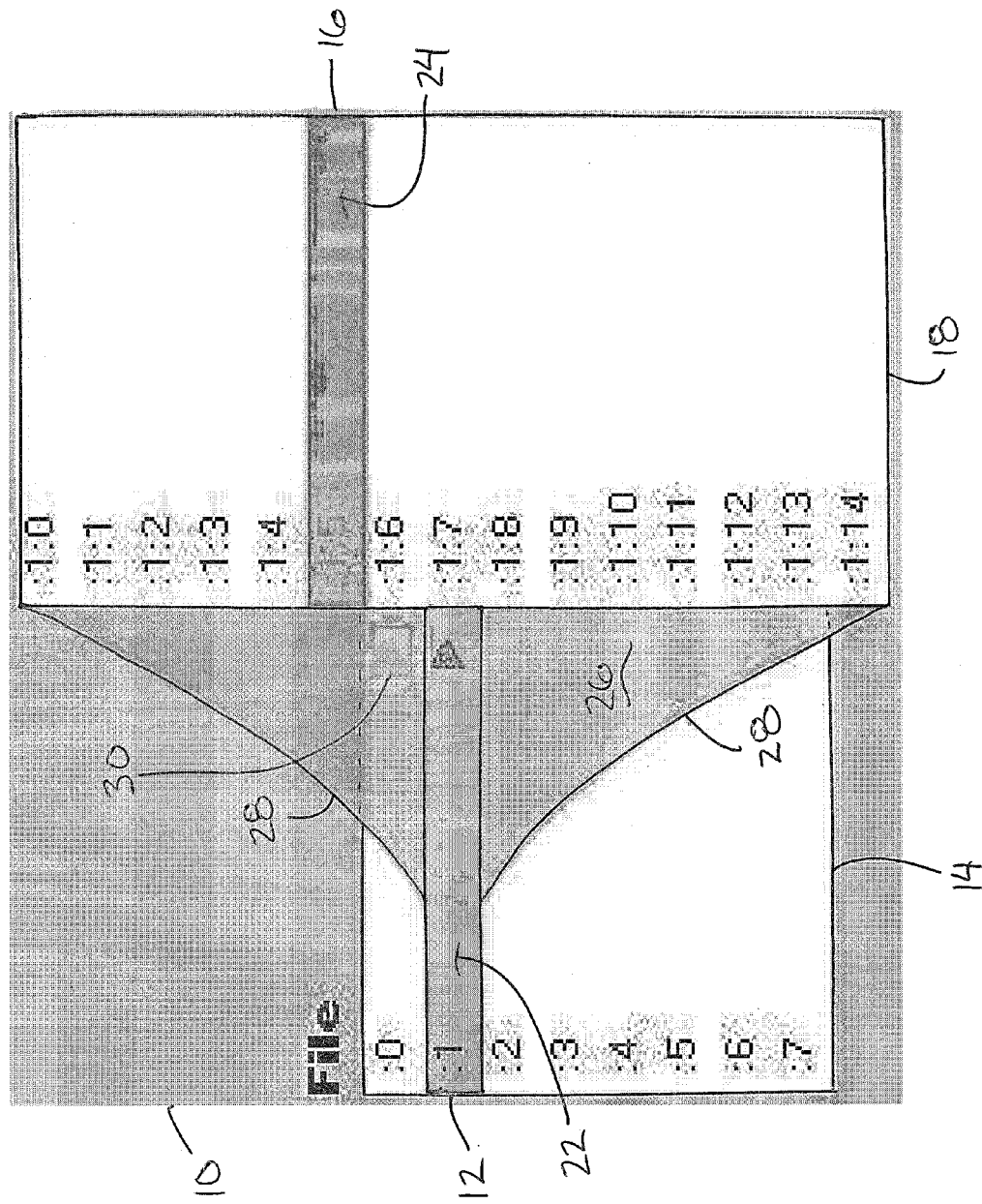
FIG. 18 is an example of a task in the final experiment in which a click on the "File" button activated the menu and a click on the highlighted target ended the trial.
Figure 19:
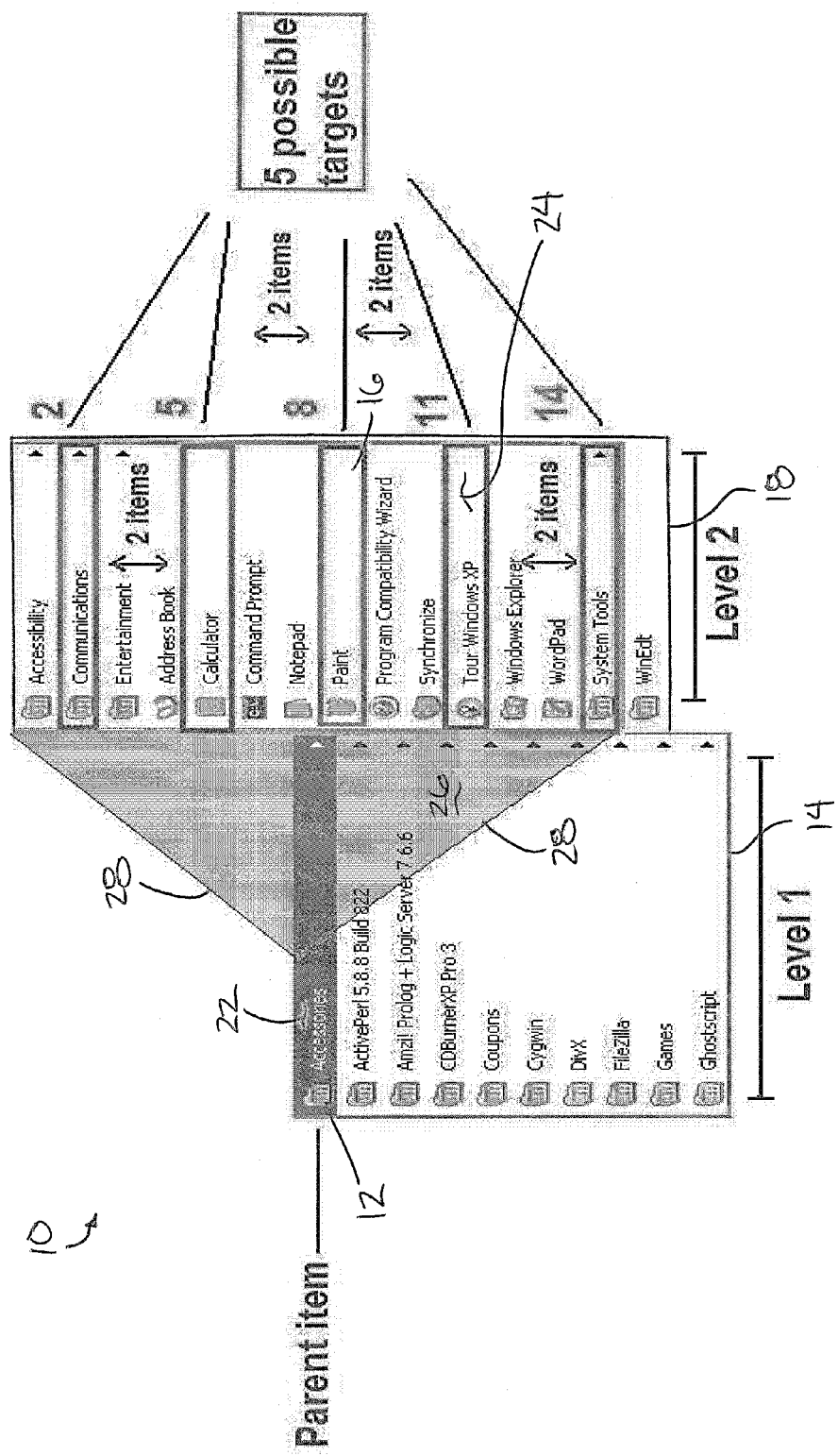
FIG. 19 is an illustration of a two-level deep menu showing five target positions in which each target position is two items apart.

Tasks:

The experiment was conducted using both the select and search tasks de-scribed in experiment 1 and 2 respectively. Menu depth was constant at 2, and there were 10 items in the first level and fifteen items in the second level. Five relative target positions were tested: 2, 5, 8, 11 and 14 (see FIG. 19). The menus were drawn in the center of the screen to enable center alignment in all scenarios. An example of a trial in this experiment is shown in FIG. 18.

Task order was counterbalanced, with 19 participants performing search task first and 20 participants performed selection first. Within each task, there were 160 trials which were divided into four blocks, one per each technique. Each block contained 30 actual and 10 practice trials. Within each block, all trials were performed four times, one for each menu type. The order of menus was randomized using a Latin-square. The entire experiment lasted approximately 30 minutes including breaks.

Conditions:

Menus: Experiment 4 tested four menus types: AAMU-Curve-Click, AAMUs, EMUs and default. Tasks: We tested two types of tasks: Select (expert behaviour) and Search (novice behaviour).

Cascading Density: Given that the techniques appear to be sensitive to cascading density, we surveyed commonly used applications to get a sense of typical density values. The applications surveyed included MS Word, MS Excel, MS Power Point, MS Internet Explorer, Mozilla Firefox, SPSS 16, MS Visual Studio 2005, Matlab, Adobe Photoshop and MS outlook. Our survey revealed that cascading density varies between 0 to 100 percent, with 20, 50 and 80 percent being common values. Hence we tested these three density levels in our experiment.

Width: In addition to menu type, task and density, we included a fourth factor which was menu width (125 vs 195).

Apparatus:

The experiment was conducted on Pentium 4 desktop computers running Windows XP operating system. A full screen-color mode with a 1024×768 resolution was used. A conventional optical mouse was used as an input device.

Design:

The design of the experiment was as follows: 2 tasks×2 widths×3 densities×4 menus types.

Findings of Experiment 4:

Out the 39 participants, 3 completed only the first half of the experiment. Prior to analyzing the data with an RM ANOVA, outlier trials, defined as greater than 3 standard deviations from the mean, were also removed. This left us with a full set of data (i.e., data in all experiment cells) for 30 participants (14 which completed the Search task first and 16 completed the Select task first). To analyze the data we ran a Repeated Measures ANOVA with "completion time" as the dependent variable, Menu, Task, Width, and Density as within-subject factors. All pairwise comparisons are corrected using the Bonferroni adjustment. The RM-ANOVA revealed main effects of Menu ($F_{(3,87)}=9.349$, $p<0.001$), Task ($F_{(1,29)}=667.706$, $p<0.001$), Width ($F_{(1,29)}=8.620$, $p=0.006$) and Density ($F_{(2,58)}=252.897$, $p<0.001$). There were also significant interactions between Menu×Task ($F_{(3,84)}=9.516$, $p<0.001$), Menu×Density ($F_{(4.211,122.125)}=3.659$, $p=0.007$), Menu×Width×Density ($F_{(4.169,120.906)}=4.994$, $p=0.001$).

Figure 20:
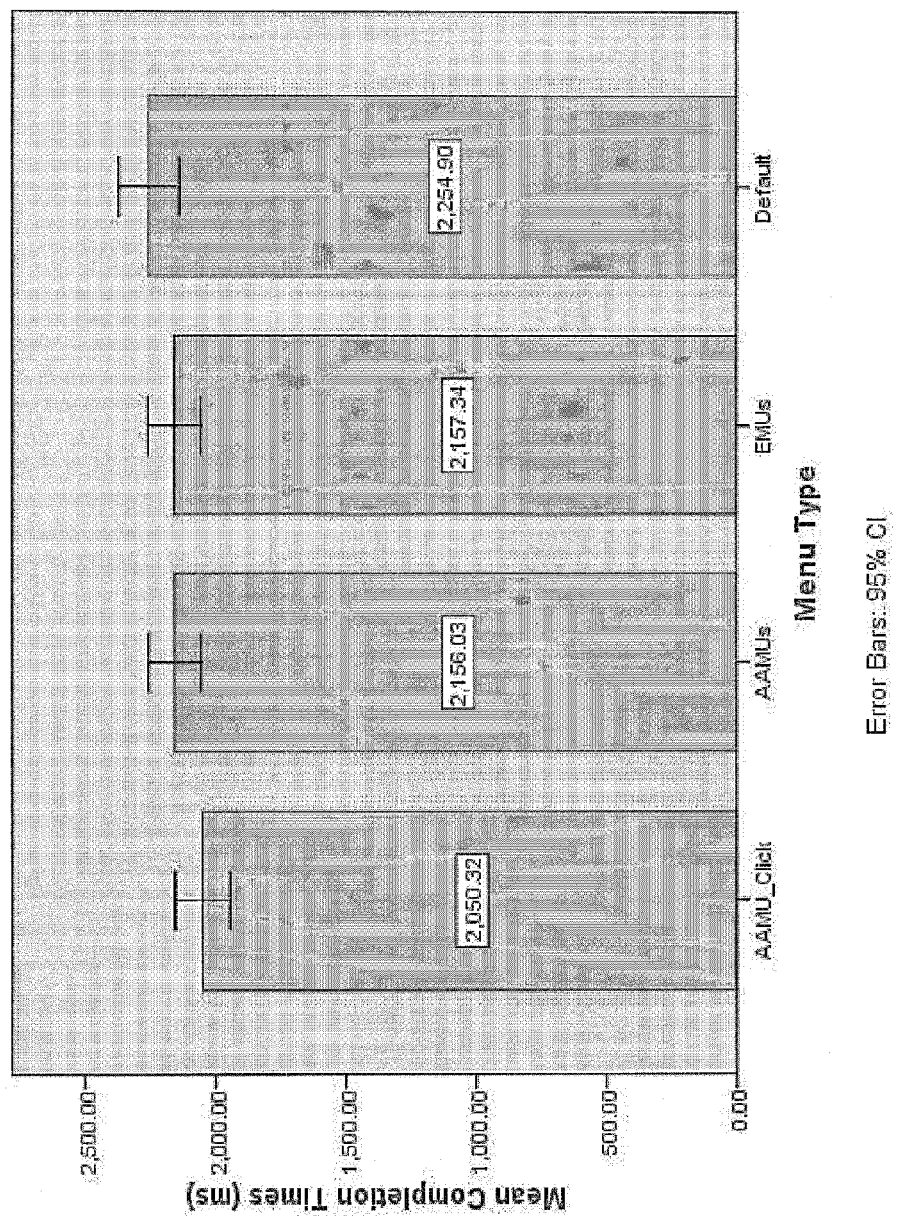
FIG. 20 is a bar graph representing mean completion times for all menus over both times for N=30.
Figure 21:
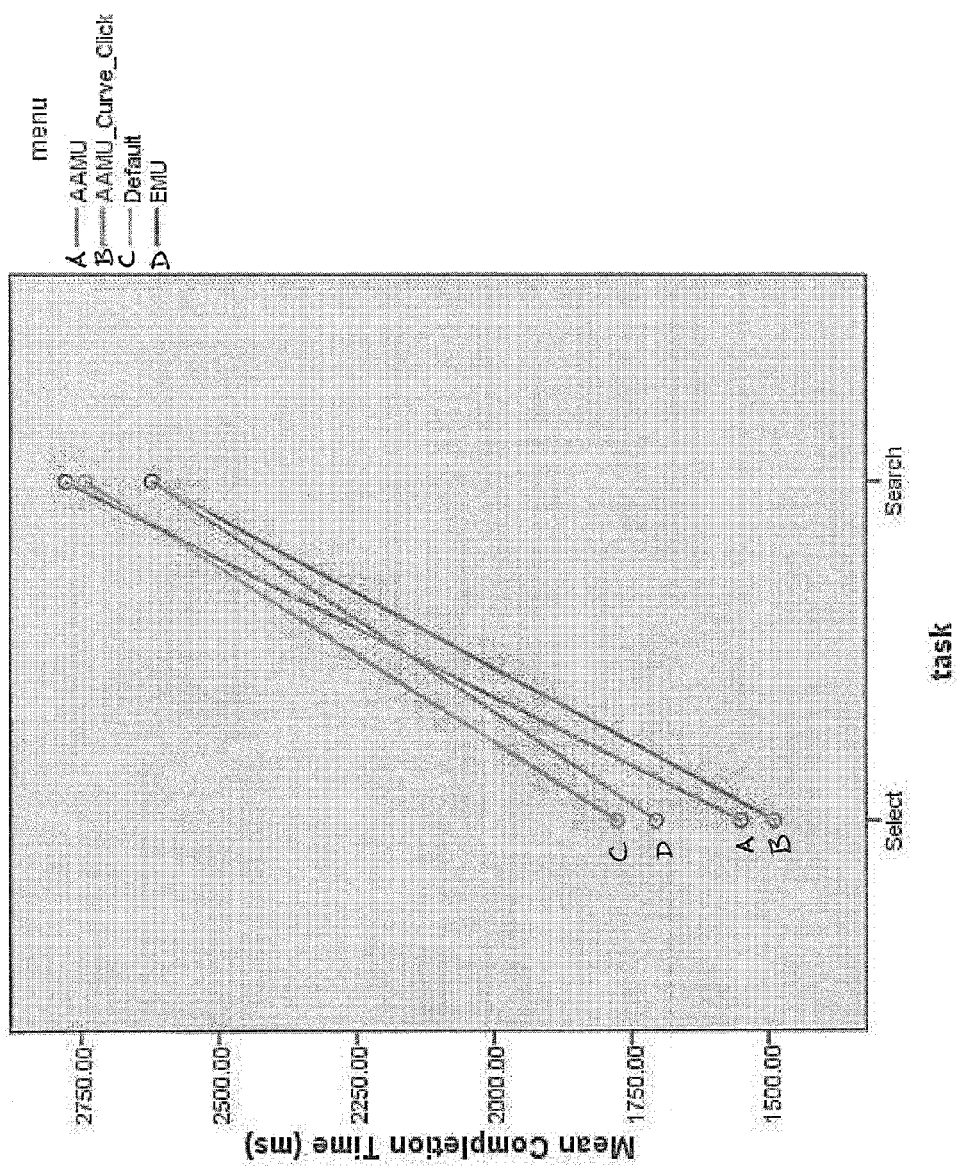
FIG. 21 is a graphical representation of the interaction between Menu type and Task Type for N=30.

FIG. 20 displays the overall means per Menu type. Pairwise comparisons showed that AAMU-Curve-Click (mean 2.05 s, sd 0.281) was significantly faster than AAMUs (mean 2.16 s, sd 0.267, $p=0.003$), default (mean 2.25 s, sd 0.310, $p=0.008$) and EMUs (mean 2.26 s, sd 0.271, $p<0.001$). AAMUs were significantly better only than default ($p=0.033$) as were EMUs ($p=0.016$). No other pairwise comparisons resulted in significant differences.

We next examine the nature of the two-way interactions between Menu×Task and Menu×Depth. This is followed by a look at the three-way interaction between Menu, Task and Width.

Select: AAMU-Curve-Click (1.486 s, sd 0.213) was significantly faster than EMU (1.697 s, sd 0.275, $p<0.001$) and Default (1.771 s, sd 0.268, p<0.001). AAMU (1.541 s, sd 0.250) was significantly faster than EMU (p=0.01) and Default (p=0.001).

Search: There was a marginally significant difference between AAMU-Curve-Click (2.615 s, sd 0.417) and AAMU (2.770 s, sd 0.370, p=0.09), and between AAMU-Curve-Click and EMU (2.618, 0.352, p=0.08). No other pairwise comparisons were significant or marginally significant.

Figure 22:
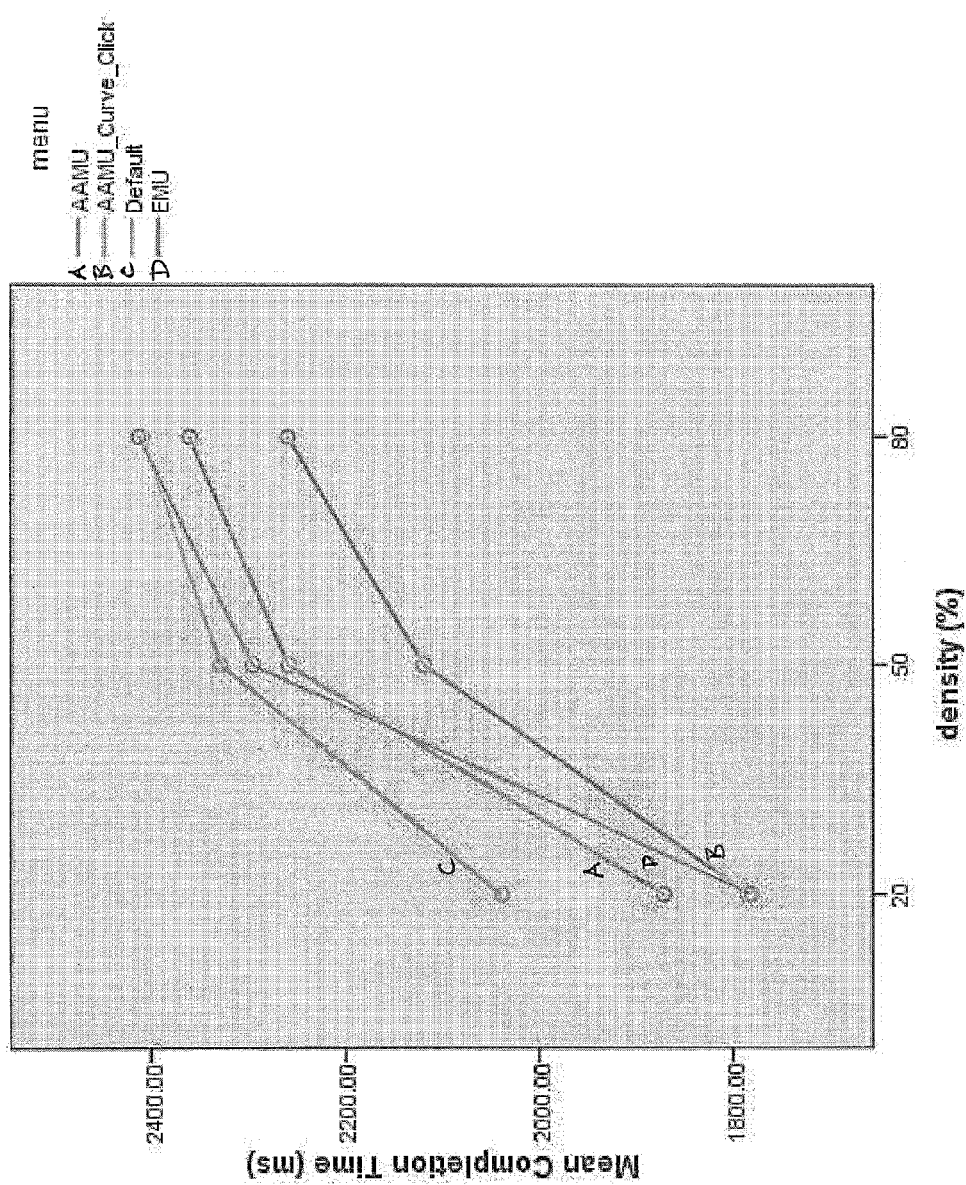
FIG. 22 is a graphical representation of the interaction between Menu type and cascading density for N=30.

FIG. 22 illustrates the nature of the 2-way interaction effect between Menu and Task on completion time. Pairwise comparisons for each cascading density level revealed the following:

Cascading Density 20: Default (2.001 s, sd 0.388) is significantly slower than all techniques (AAMU-Curve-Click: 1.806 s, sd 0.341, p<0.001; AAMU: 1.849 s, sd 0.295, p<0.001; EMU: 1.811 s, sd 0.263, p=0.046).

Cascading Density 50: AAMU-Curve-Click (2.134 s, sd 0.324) is significantly faster than AAMU (2.258 s, sd 0.325, p=0.048) and Default (2.312 s, sd 0.434, p=0.016).

Cascading Density 80: AAMU-Curve-Click (2.222 s, sd 0.350) is significantly faster than EMU (2.405 s, sd 0.373, p=0.008) and Default (2.326 s, sd 0.354, p=0.034).

Figure 23:
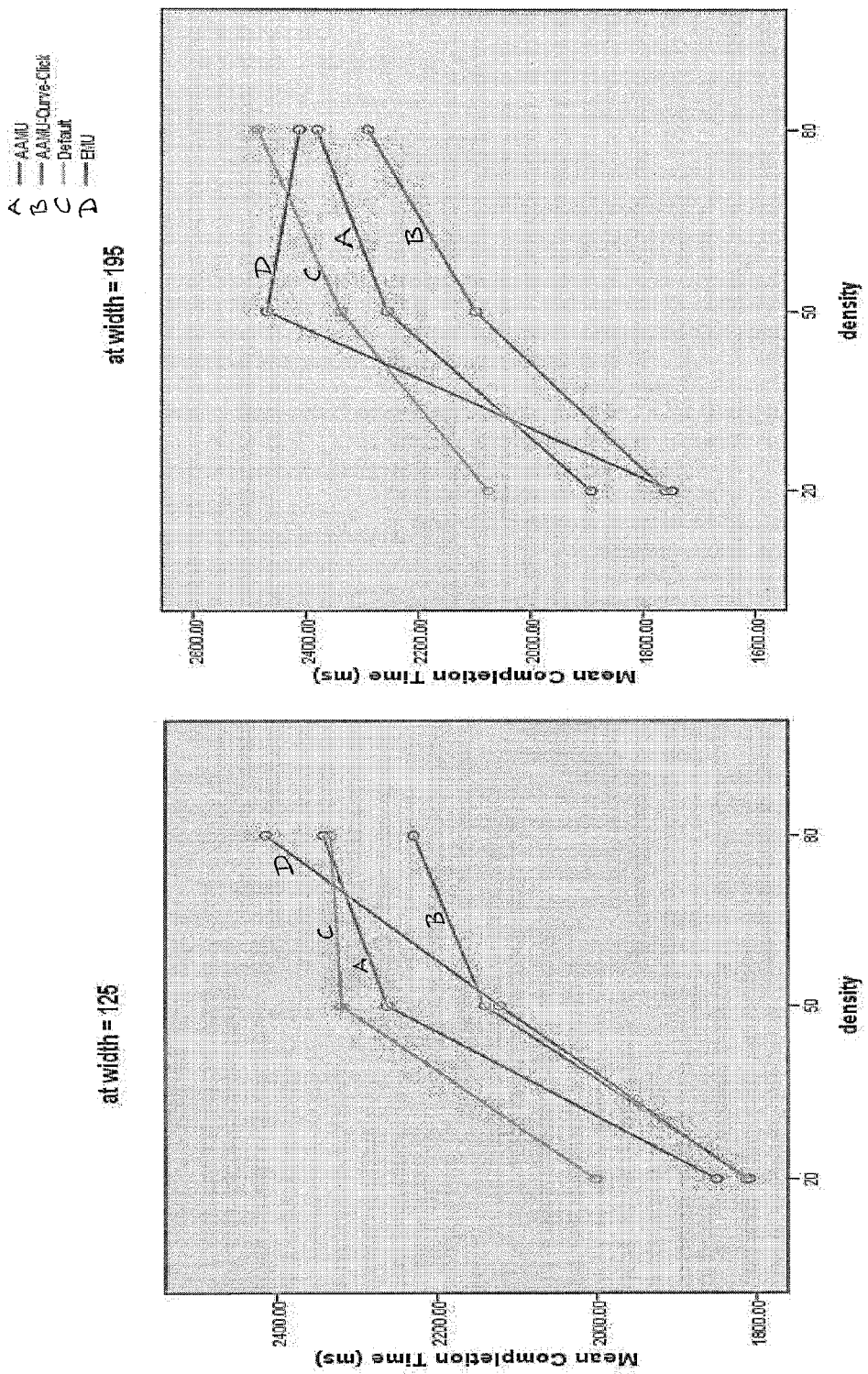
FIG. 23 is a graphical representation of the three-way interaction effect of Menu X density X Width on Completion time.

Impact of Width and Density:

Finally, FIG. 23 displays the nature of the 3-way interaction between Menu, Density and Width on completion time. While AAMU-Curve-Click consistently outperforms AAMU and Default, its relationship with EMU is more dependent on the width and density. It begins to outperform EMU at higher densities, particularly as the menu width increases.

Discussion:

Overall, across all task, widths and densities, AAMU-Curve-Click performed significantly better than AAMUs, the default and EMUs technique. Further decomposition of the data reveals two key insights into the strengths and limitations of the improved AAMU design. First, AAMU-Curve-Clicks is significantly better than all techniques studied in the Select task, where the user knows the location of the target. In a search task, there is a trend indicating that AAMU-Curve-Click helps mitigate the trapping problem first identified in Experiment 2, as it is marginally significantly faster than both the original AAMUs and EMUs and is no worse than default. Second, when examining the impact of cascading density, we see that AAMU-Curve-Click's benefit comes at medium and high densities, where more trapping it likely to occur. It is superior to all other techniques high density, while at medium density it im-proves upon the basic AAMU design and is no different other techniques.

The Adaptive Activation Area Menu's (AAMUs) described herein are a new and novel cascading menu design which allows the user to navigate and perform operations such as item selection and searching efficiently. User studies have showed AAMUs significantly outperform all existing designs when it comes to faster navigation and accurate selection. Some of the major features incorporated into the present invention are summarized in the following.

In the first and second embodiment, AAMUs are static for the most part. The shape is fixed as a curve and the drawing position is adapted according to the users' cursor position. The size is adapted after the child submenu size. However there are no adaptations done based on the user (users' movements specifically).

The third embodiment described above is an intelligent adaptable version of AAMUs which adapts its shape and size to the user's movement pattern and continues to learn from them. For instance, users begin an interface with no AAMU attached to their menus. However, as they make more errors in selecting submenus, the activation area begins to enlarge. Conversely, if their path shows that they do not rely on the activation area as much, the size of it shrinks. As a result, the size of the activation area is modified based on the usage patterns exhibited by users.

We have conducted observation studies with many users performing item selection and searching using AAMUs. Various factors including menu length, menu width, target item position etc have been included in those experiments to learn how users interact in different scenarios. Based on the data learned from these studies a mathematical model can be developed that predicts the users' movement patterns. This model can facilitate the design of menus in the following ways:

i) Based on user's movement, a better shape (besides triangle) of the activation area can be created/adapted. For some users a wider activation area may be ideal but for others a narrow shape might work better.

ii) Based on the user's movement, different size can be adapted as well. The activation area can start small and increase as required by the user or vice versa.

iii) The movement patterns may vary depending on individual users or with respect to the relative positioning of the child item. Therefore the model can predict the best shape and size for the initial activation area best suited to the situation at hand. For instance if the target item is towards the top of the screen, the activation area only expands upwards (where it's required).

iv) This model will not only provide the basis for an optimum (starting) design but will also allow that AAMUs to improve continuously by learning from the user in run time and adapting to each particular user.

The AAMUs can also be customizable. If for some reason users don't like the automated version, they should be able to pick and choose between various sizes, shapes and also different types of AAMUs (curved, Hover, Click, and Classic).

AAMUs can be extended to other menu types besides linear cascading menus, for instance marking menus, pie menus etc. It is also possible to design interface widgets based on AAMUs for use in current day-to-day menu navigation environments, such as with web interfaces, large displays, hand held devices etc.

The size of the activation area can grow or shrink based on the usage patterns. If users are 'falling off' the steering path to reach at submenus, the AAMU activation area grows. Subsequently, if they stay more often on the path the size of it shrinks. The reason for shrinking and growing is to strike a balance in avoid "steer off" (this is why we have the AAMUs) and "trapping". "Steer off", occurs when the user goes off the path and the submenu gets unposted as a result. "Trapping" occurs when the users cursor is in the activation area and does not move out as a consequence.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the respective object area of said one of the parent menu objects in the display;

providing an activation area in the display which is associated with the submenu in which the activation area spans in a working direction extending between a first end adjacent said one of the parent menu objects which is farthest from the submenu and a second end opposite the first end so as to be adjacent to the submenu associated with said one of the parent menu objects;

continuing to display the submenu associated with said one of the parent menu objects while the cursor remains in contact with the associated activation area; and hiding the submenu in the display by performing an override function with the pointing device while the cursor remains in contact with the activation area associated with the submenu by hovering the cursor in a fixed position for a prescribed duration in contact with the object area of a different one of the parent menu objects which is overlapped by the activation area.

2. The method according to claim 1 including providing a hover icon overlapping said different one of the parent menu objects when the cursor is in contact with said different one of the parent menu objects and performing the override function by hovering the cursor in contact with the hover icon.

3. The method according to claim 1 including shaping the activation area to comprise two opposing side edges extending between the first end and the second end of the activation which diverge from one another from the first end to the second end and which are curved inwardly so as to be concave.

4. The method according to claim 3 including shaping the activation area such that the two opposing side edges are joined with one another at an apex at the first end of the activation area.

5. The method according to claim 3 including positioning the first end of the activation area such that the first end is spaced from the cursor in the working direction towards the submenu with which the activation area is associated.

6. The method according to claim 3 including shaping the activation area such that the two opposing side edges are symmetrical with one another.

7. The method according to claim 1 including varying a characteristic of the activation area in response to a previous menu navigating motion pattern received from a user through the pointing device.

8. The method according to claim 7 including varying a characteristic of the activation area by varying a shape of the activation area.

9. The method according to claim 7 including shaping the activation area to comprise two opposing side edges extending between the first end and the second end of the activation area which diverge from one another from the first end to the second end, and varying a characteristic of the activation area by varying a width of the activation area between the two opposing side edges in proximity to the first end.

10. The method according to claim 9 including maintaining a width between the two opposing side edges at the second end to be equal to a corresponding dimension of the submenu.

11. The method according to claim 9 including increasing the width between the two opposing side edges in proximity to the first end when the previous menu navigating motion pattern corresponds to a previous movement of the cursor along a path which exits the activation area while attempting to select one of the submenu objects.

12. The method according to claim 9 including decreasing the width between the two opposing side edges in proximity to the first end when the previous menu navigating motion pattern corresponds to a previous movement of the cursor along a path which is spaced from both of the two opposing side edges.

13. The method according to claim 1 including displaying the selectable objects as a linear cascading menu.

14. The method according to claim 1 including displaying the selectable objects as a pie menu.

15. A method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the respective object area of said one of the parent menu objects in the display;

providing an activation area in the display which is associated with the submenu in which the activation area spans in a working direction extending between a first end adjacent said one of the parent menu objects which is farthest from the submenu and a second end opposite the first end so as to be adjacent to the submenu associated with said one of the parent menu objects;

continuing to display the submenu associated with said one of the parent menu objects while the cursor remains in contact with the associated activation area; and shaping the activation area to comprise two opposing side edges extending between the first end and the second end of the activation area which diverge from one another from the first end to the second end and which are curved inwardly so as to be concave.

16. The method according to claim 15 including shaping the activation area such that the two opposing side edges are symmetrical with one another.

17. A method of displaying a hierarchy of selectable objects including a plurality of parent menu objects and a plurality of submenu objects associated with at least one of the parent menu objects in a display with a pointing device controlling a position of a cursor in the display associated therewith, the method comprising:

displaying the parent menu objects in a parent menu such that each parent menu object of the parent menu occupies a respective object area in the display;

displaying the submenu objects associated with one of the parent menu objects in a submenu when the cursor contacts the respective object area of said one of the parent menu objects in the display;

providing an activation area in the display which is associated with the submenu in which the activation area spans in a working direction extending between a first end adjacent said one of the parent menu objects which is farthest from the submenu and a second end opposite the first end so as to be adjacent to the submenu associated with said one of the parent menu objects;

continuing to display the submenu associated with said one of the parent menu objects while the cursor remains in contact with the associated activation area; and varying a shape characteristic of the activation area in response to a previous menu navigating motion pattern received from a user through the pointing device.

18. The method according to claim 17 including shaping the activation area to comprise two opposing side edges extending between the first end and the second end of the activation area which diverge from one another from the first end to the second end, and varying a shape characteristic of the activation area by varying a width of the activation area between the two opposing side edges in proximity to the first end.

* * * * *